United States Patent
Kleinrouweler et al.

(10) Patent No.: US 11,695,818 B2
(45) Date of Patent: Jul. 4, 2023

(54) FACILITATING REAL-TIME TRANSPORT OF DATA STREAMS

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Jan Willem Martin Kleinrouweler, Pijnacker (NL); Pieter Nooren, Delft (NL); Lucia D'Acunto, Delft (NL)

(73) Assignees: KONINKLIJKE KPN N.V., Rotterdam (NL); NEDERLANDSE ORGANISATIE VOOR TOEGEPAST-NATUURWETENSCHAPPELIJK ONDERZOEK TNO, 's-Gravenhage (NL)

( * ) Notice: Subject to any disclaimer, the term of this patent is extended or adjusted under 35 U.S.C. 154(b) by 0 days.

(21) Appl. No.: 17/438,743

(22) PCT Filed: Mar. 13, 2020

(86) PCT No.: PCT/EP2020/056918
§ 371 (c)(1),
(2) Date: Sep. 13, 2021

(87) PCT Pub. No.: WO2020/187768
PCT Pub. Date: Sep. 24, 2020

(65) Prior Publication Data
US 2022/0109717 A1    Apr. 7, 2022

(30) Foreign Application Priority Data
Mar. 15, 2019    (EP) ..................................... 19163134

(51) Int. Cl.
*H04L 65/65*    (2022.01)
*H04L 47/22*    (2022.01)
(Continued)

(52) U.S. Cl.
CPC ............ *H04L 65/65* (2022.05); *H04L 47/225* (2013.01); *H04L 47/24* (2013.01); *H04L 47/528* (2013.01); *H04L 65/80* (2013.01)

(58) Field of Classification Search
CPC ..... H04L 65/608; H04L 65/80; H04L 47/225; H04L 47/24
(Continued)

(56) References Cited

U.S. PATENT DOCUMENTS 7,397,818 B2 * 7/2008 Restivo .................. H04L 5/143
370/336
10,250,921 B1 * 4/2019 Yang .................. H04N 21/2187
(Continued)

FOREIGN PATENT DOCUMENTS

EP    1284073 B1 * 8/2007 ............. H04L 12/14

OTHER PUBLICATIONS

S. Petrangeli, et al., "Dynamic Video Bitrate Adaptation for WebRTC-Based Remote Teaching Applications," In: Proceedings of the 2018 IEEE/IFIP Network Operations and Management Symposium (NOMS '18), Taipei, Taiwan, 2018, pp. 1-5.
(Continued)

*Primary Examiner* — Zi Ye
(74) *Attorney, Agent, or Firm* — Hamilton, Brook, Smith & Reynolds, P.C.

(57) ABSTRACT

An interface may be provided between i) a selective forwarding unit (SFU) configured to, in real-time, receive a data stream from a sender via a first network link of a communication network and selectively forward the data stream to one or more receivers via respective second network links, and ii) one or more core network functions (PCF, PCRF, NSMF, CSMF) for establishing service guarantees for data flows in the communication network. In a specific example, the interface may be established as a
(Continued)

network function (SMGF) which translates streaming requirements for one-to-many flows coming from WebRTC SFUs into appropriate QoS/network slice configurations, such that the quality of RTC flows may be increased. Accordingly, negative side-effects of conservative congestion control algorithms in WebRTC clients and static/over-provisioned QoS at network operators may be overcome.

8 Claims, 9 Drawing Sheets

(51) Int. Cl.
    *H04L 47/24*     (2022.01)
    *H04L 47/52*     (2022.01)
    *H04L 65/80*     (2022.01)

(58) Field of Classification Search
    USPC .......................................................... 709/224
    See application file for complete search history.

(56) References Cited

U.S. PATENT DOCUMENTS

| | | | |
|---|---|---|---|
| 10,455,194 B1 * | 10/2019 | Yang | H04N 7/15 |
| 2010/0061249 A1 * | 3/2010 | Rius i Riu | H04L 41/06 |
| | | | 370/242 |
| 2013/0290493 A1 | 10/2013 | Oyman et al. | |
| 2019/0007466 A1 | 1/2019 | Ivov et al. | |

OTHER PUBLICATIONS

K. Haensge, et al., "QoS-based WebRTC Access to an EPS Network Infrastructure," In: Proceedings of the 18th International Conference on Intelligence in Next Generation Networks (ICIN' 15), Paris, France, 2015, pp. 9-15.

EP Search Report for European Application No. 19163134.0, entitled: Facilitating Real-Time Transport of Data Streams dated Sep. 17, 2019.

International Search Report and Written Opinion for PCT/EP2020/056918, entitled Facilitating Real-Time Transport of Data Streams, dated Jun. 9, 2020.

3GPP TR 28.801 v15.1.0 (Jan. 2018) $3^{Rd}$ Generation Partnership Project; Technical Specification Group Services and System Aspects; Telecommunication Management; Study of Management and Orchestration of Network Slicing for Next Generation Network (Release 15).

3GPP TR 23.203 v15.4.0 (Sep. 2018) $3^{Rd}$ Generation Partnership Project; Technical Specification Group Services and System Aspects; Policy and Charging Control Architecture (Release 15).

3GPP TS 23.501 v15.4.0 (Dec. 2018) $3^{Rd}$ Generation Partnership Project; Technical Specification Group Services and System Aspects; System Architecture for the 5G System, Stage 2 (Release 15).

3GPP TS 29.513 V15.2.0 (Dec. 2018) $3^{Rd}$ Generation Partnership Project; Technical Specification Group Services and System Aspects; 5G System; Policy and Charging Control Signalling Flows and QoS Parameter Mapping; Stage 3 (Release 15).

\* cited by examiner

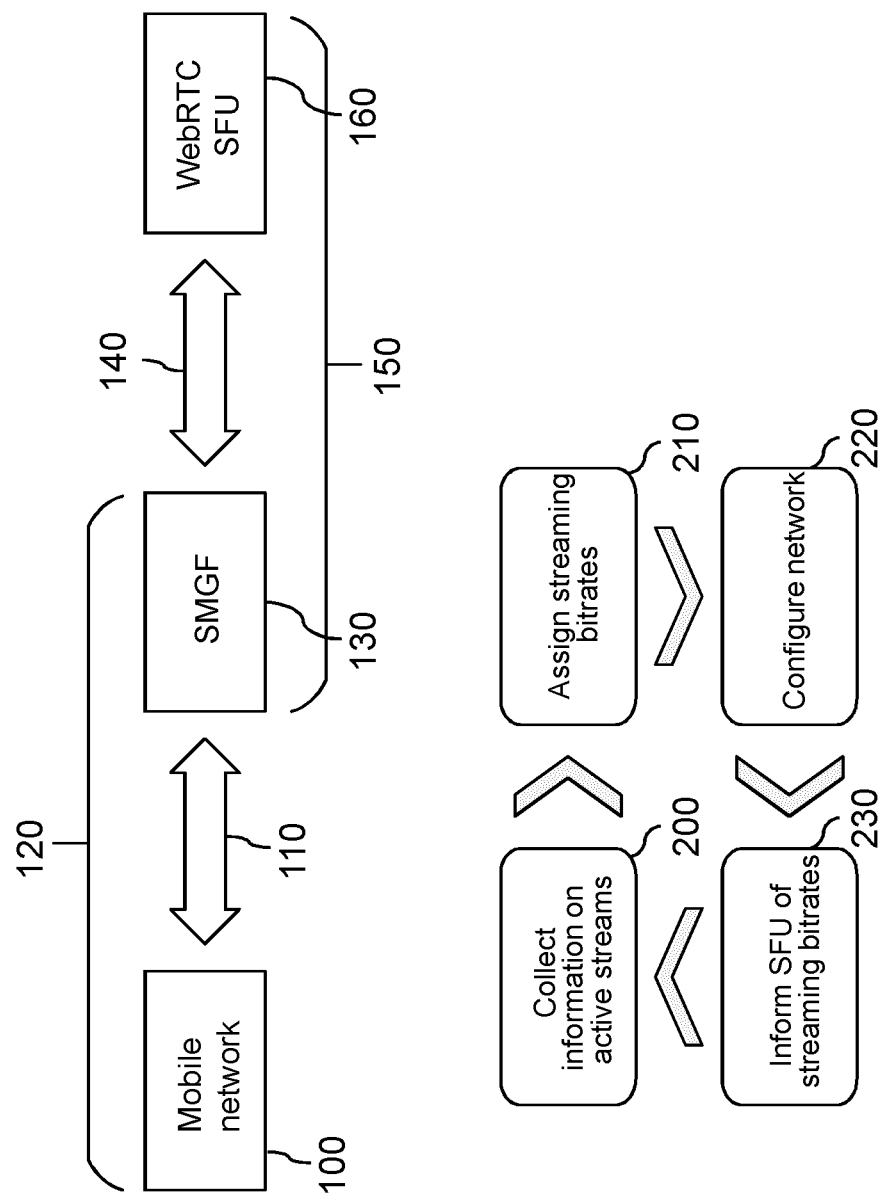

FACILITATING REAL-TIME TRANSPORT OF DATA STREAMS

RELATED APPLICATIONS

This application is the U.S. National Stage of International Application No. PCT/EP2020/056918, filed Mar. 13, 2020, which designates the U.S., published in English, and claims priority under 35 U.S.C. § 119 or 365(c) to European Application No. 19163134.0, filed Mar. 15, 2019. The entire teachings of the above applications are incorporated herein by reference.

FIELD OF THE INVENTION

The invention relates to a network node or a distributed system of network nodes and a computer-implemented method for facilitating real-time transport of data streams in a communication network by providing an interface between a selective forwarding unit and one or more core network functions. The invention relates to the selective forwarding unit configured for selectively forwarding data streams, and to a computer-implemented method for the same. The invention further relates to a device for transmitting a data stream to the selective forwarding unit. The invention further relates to a data structure for use by an entity providing an interface between the selective forwarding unit and one or more core network functions.

BACKGROUND ART

Real Time Communication (RTC) is a form of networked communication with a focus on a low latency between sender and receiver. RTC use cases are often also characterized by large data volumes, for example in the case of video-based conferencing. WebRTC is a popular implementation of RTC as it is compatible with Web browsers and mobile applications. RTC has stringent network performance requirements, that, if they are not met, will negatively impact the end-user experience. The following provides a brief background on WebRTC. It will be appreciated, however, that other RTC implementations, as well as other types of mechanisms for real-time transport of data streams which may not be identified as RTC per se, may also have similar stringent network performance requirements.

WebRTC is widely used for applications with low-latency and high-bandwidth networking requirements, such as video-based team communication and collaboration applications. Besides video conferencing, WebRTC is considered an enabler for surveillance, healthcare, Internet of Things (IoT), and connected self-driving automobiles.

WebRTC supports many-to-many communications between peers, where a peer can be a sender, receiver, or both. Although WebRTC was initially designed with a mesh topology (e.g., peer-to-peer) in mind, practical deployments use centralized aggregators that route the streams from sending to receiving peers. Depending on the aggregator type, an aggregator mixes incoming streams or just forwards (a subset) of the streams to the receivers.

Forwarding streams, using so-called Selective Forwarding Units (SFUs), may have advantages over mesh topologies and mixing aggregators (e.g., Multipoint Controller Units (MCUs)). Compared to mesh topologies, SFUs may provide better scalability in one-to-many and many-to-many configurations. With an SFU, a sender only has to send one stream to the SFU, instead of many individual streams to each receiving peer. Compared to MCUs, SFUs do not require intensive video processing. As such, SFUs support use cases with a large number of streams, use cases where different peers receive a different subset of streams. Similar advantages of SFUs over MCUs apply to non-video related use cases as well.

Most WebRTC services deliver their RTC streams over-the-top (OTT). This means that there may not be any controlling element in the network involved that may control or provide guarantees on network performance. As a result, WebRTC implementations typically take one of the following two approaches to ensure the delivery of RTC streams.

The first approach is a "one size fits all" approach that uses a low streaming bitrate in general. However, this approach may prevent using the full potential of the communication network, may limit the possibilities for applications that require high streaming bitrates, and may deliver an overall poor experience to the end-user.

The second approach is to use congestion control mechanisms in WebRTC players to adapt the streaming bitrate to the available bandwidth in the network. However, bandwidth estimations of WebRTC clients may be unreliable and lead to low performance. When relying on bandwidth estimations, WebRTC clients typically only use 80% of the available resources. With other traffic in the same network, the WebRTC congestion algorithms may have the tendency to back off, reducing the streaming bitrate several times. As a result, WebRTC may not be able to serve the users with high streaming bitrates. Furthermore, streaming bitrates may be highly variable and sharing of resources between concurrent WebRTC flows may be unfair.

Document [1] describes an SFU for WebRTC which is described to collect bandwidth estimations from the receivers, compute an 'optimal' set of streaming bitrates given the estimated bandwidth of all clients, and forward the target bitrates to the sending node, which then adapts its video quality. As such, the WebRTC SFU is said to enable a better sharing of resources between concurrent WebRTC flows.

Document [2] describes a method to support QoS for WebRTC clients in mobile devices. This proposal extends the 3GPP IP Multimedia Subsystem (IMS) described in 3GPP TS 23.228 Annex U, integrating QoS for WebRTC clients that use the IMS. Modified WebRTC clients may then request QoS from LTE mobile networks.

REFERENCES

[1] S. Petrangeli, D. Pauwels, H. van der Hooft, J. Slowack, T. Wauters, F. De Turck. *Dynamic Video Bitrate Adaptation for WebRTC-Based Remote Teaching Applications.* In: Proceedings of the 2018 IEEE/IFIP Network Operations and Management Symposium (NOMS'18), Taipei, Taiwan, 2018, pp. 1-5.

[2] K. Hænsge, M Maruschke. *QoS-based WebRTC Access to an EPS Network Infrastructure.* In: Proceedings of the 18th International Conference on Intelligence in Next Generation Networks (ICIN'15), Paris, France, 2015, p.p. 9-15.

SUMMARY OF THE INVENTION

It may be desirable to better facilitate real-time transport of data streams in a communication network by establishing service guarantees in the network.

In accordance with a first aspect of the invention, a network node or a distributed system of network nodes may be provided for facilitating real-time transport of data streams in a communication network. The communication network may comprise:
- one or more core network functions (PCF, PCRF, NSMF, CSMF) for establishing service guarantees for data flows in the communication network;
- at least one selective forwarding unit (SFU) configured to, in real-time, receive a data stream from a sender via a first network link of the communication network and selectively forward the data stream to one or more receivers via respective second network links;

The network node or the distributed system may comprise:
- a network interface configured to interface with the communication network;
- a processor subsystem which may be configured to interface between the selective forwarding unit and the one or more core network functions by:
  - receiving stream information from the selective forwarding unit, the stream information being indicative of a first bandwidth associated with transport of the data stream via a select one or more network links, the select one or more network links being one or more of a group of: the first network link and the respective second network links;
  - based on the stream information, requesting the one or more core network functions to establish a service guarantee for the transport of the data stream via the select one or more network links; and
  - based on the stream information, providing bitrate information to the selective forwarding unit, the bitrate information being indicative of a target bitrate to be used for the transport of the data stream via the select one or more network links.

In accordance with a further aspect of the invention, a method may be provided for facilitating real-time transport of data streams in a communication network.

The communication network may comprise:
- one or more core network functions (PCF, PCRF, NSMF, CSMF) for establishing service guarantees for data flows in the communication network;
- at least one selective forwarding unit (SFU) configured to, in real-time, receive a data stream from a sender via a first network link of the communication network and selectively forward the data stream to one or more receivers via respective second network links;

The method may comprise interfacing between the selective forwarding unit and the one or more core network functions by:
- receiving stream information from the selective forwarding unit, the stream information being indicative of a first bandwidth associated with transport of the data stream via a select one or more network links, the select one or more network links being one or more of a group of: the first network link and the second network links;
- based on the stream information, requesting the one or more core network functions to establish a service guarantee for the transport of the data stream via the select one or more network links; and
- based on the stream information, providing bitrate information to the selective forwarding unit, the bitrate information being indicative of a target bitrate to be used for the transport of the data stream via the select one or more network links.

In accordance with a further aspect of the invention, a network node or a distributed system of network nodes may be configured as a selective forwarding unit (SFU) by being configured to, in real-time, receive a data stream from a sender via a first network link of a communication network and selectively forward the data stream to one or more receivers via respective second network links. The network node or the distributed system may comprise:
- a network interface configured to interface with the communication network;
- a communication interface to an entity providing an interface between i) the selective forwarding unit and ii) one or more core network functions for establishing service guarantees for data flows in the communication network;
- a processor subsystem which may be configured to:
  - via the communication interface, provide stream information to the entity, the stream information being indicative of a first bandwidth associated with transport of the data stream via a select one or more network links, the select one or more network links being one or more of a group of: the first network link and the second network links;
  - via the communication interface, obtain bitrate information from the entity, the bitrate information being indicative of a target bitrate to be used for the transport of the data stream via the select one or more network links; and
  - via the network interface, provide the bitrate information or another data representation of the target bitrate to the sender and/or one or more receivers.

In accordance with a further aspect of the invention, a computer-implemented method may be provided for, in real-time, receiving a data stream via a first network link of a communication network and selectively forwarding the data stream to one or more receivers via respective second network links. The method may comprise:
- providing stream information to an entity providing an interface to one or more core network functions for establishing service guarantees for data flows in the communication network, the stream information being indicative of a first bandwidth associated with transport of the data stream via a select one or more network links, the select one or more network links being one or more of a group of: the first network link and the second network links;
- obtaining bitrate information from the entity, the bitrate information being indicative of a target bitrate to be used for the transport of the data stream via the select one or more network links; and
- providing the bitrate information or another data representation of the target bitrate to the sender and/or one or more receivers.

In accordance with a further aspect of the invention, a transitory or non-transitory computer-readable medium is provided comprising a computer program, the computer program comprising instructions for causing a processor system to perform a respective method.

The above measures may involve establishing an interface between a selective forwarding unit (SFU) and one or more one or more core network functions for establishing service guarantees for real-time data flows in the communication network. Such real-time data flows may for example be based on RTC protocols, but also on the Real-Time Messaging Protocol (RTMP) or the Secure Reliable Transport (SRT) protocol. Other protocols which may enable real-time data flows may include, but are not limited to, TCP or UDP, or Web-based protocols such as HTTP with chunked transfer encoding or WebSockets. The core network functions may, in for example a communication network adhering to one or more 3GPP standards, include network functions such as the PCF, PCRF, NSMF and/or CSMF, as also discussed elsewhere. The SFU may in general be configured to receive a data stream from a sender via a first network link of the communication network and selectively forward the data stream to one or more receivers via respective second network links, e.g., representing 'one-to-many' forwarding functionality. Here, the second network links may comprise separate network links but also shared network links or a combination of both types. For example, in the case of three receivers A, B, C, the data stream may be delivered to receivers A and B via a shared network link L1 and to receiver C via a separate network link L2. It is noted that 'many-to-many' forwarding merely represents several concurrent instances of 'one-to-many' forwarding.

The interface may be established by a network node or a distributed system of network nodes, and may in some embodiments be established in the form of a network function. Such a network function is here and elsewhere also referred to as an interface function or a brokerage function, or specifically as Stream Management and Guidance Function (SMGF) owing to the functionality of the function. The following refers to 'SMGF', with the understanding that such references may also be considered to apply to the network node(s) in general.

The SMGF may interface between the SFU and the core network function(s) as follows. The SMGF may receive stream information from the SFU. Such and other type of information exchanged between network-based entities is to be understood as being exchanged as data, e.g., as a data representation of the respective information. The stream information may take various forms, but may generally be indicative of a bandwidth which is associated with the transport of the data stream, and specifically, with the transport of the data stream via the uplink (e.g., the first network link) or one of the downlinks (e.g., the second network links), or with multiple network links, e.g., the uplink and the downlinks. For example, the stream information may be indicative of a preferred bandwidth for the transport of the data stream across the select network link(s), or a minimum required bandwidth, or a maximum expected bandwidth, or an already allocated bandwidth, or several of such types of information.

Based on the stream information, the SMGF may request the one or more core network functions to establish a service guarantee for the transport of the data stream via the select network links, for example, based on QoS or network slice allocation and/or configuration. Concurrently or afterwards, the SMGF may provide bitrate information to the SFU which may be indicative of a target bitrate to be used for the transport of the data stream via the select network link(s). The target bitrate may for example be a bitrate which may be considered by the SMGF to be feasible for the transport of the data stream. For example, as will be elucidated elsewhere, the target bitrate may be based on a response received from the core network functions, e.g., indicating a guaranteed bandwidth or refusing the request for service guarantees, or may be an otherwise determined feasible bitrate. In turn, the SFU may provide the target bitrate to the sender, e.g., to cause the sender to adjust the bitrate of the data stream. The target bitrate may also be provided to the receiver(s), e.g., to inform the receiver(s) about the adjusted bitrate.

The above measures may facilitate the establishment of service guarantees for one-to-many or many-to-many (referring to several instances of one-to-many) real-time data streams. By providing the SMGF as interface, core network functions may be securely exposed to third-parties without having to provide the third-parties with direct access to the core network functions. In a specific example, the SMGF may translate streaming requirements for one- or many-to-many flows coming from WebRTC SFUs into appropriate QoS/network slice configurations, such that the quality of RTC flows may be increased. Accordingly, negative side-effects of conservative congestion control algorithms in WebRTC clients and static/overprovisioned QoS at network operators may be overcome.

With respect to the prior art approaches [1] and [2], the following is noted.

The SFU of [1] fully operates in the data plane when coordinating the streaming bitrate of WebRTC clients. As such, the SFU is not aware of any QoS or network slices and their configurations when provided by the network to increase WebRTC streaming performance. The lack of information restricts the SFU to using bandwidth estimations from receiving WebRTC clients for controlling the bandwidth. It is known that such bandwidth estimations in WebRTC clients are prone to errors. Using bandwidth estimations to determine the available bandwidth may lead to unused resources, even though they are allocated to WebRTC.

Furthermore, the SFU of [1] has no influence on the QoS—or network slicing configuration. This means that the SFU cannot re-configure QoS and network slices when changes in demand on the network occur. Insufficient QoS and small network slices may prevent the use of higher streaming bitrates, resulting in a lower quality of the stream. Overprovisioned QoS and network slices may result in inefficient use of network resources.

The method presented in [2] describes an interface for requesting QoS between a WebRTC client and an EPS network infrastructure. In this method, the WebRTC client is aware of QoS and can affect the configuration. However, the WebRTC client is in charge of requesting QoS, not the SFU. As such, the method in [2] does not allow for requesting end-to-end QoS, where both the sender and the receiver of a stream are using the mobile network. This means that sending and receiving clients have to request QoS individually, without coordination, risking different settings. This will negatively impact the streaming bitrate or result in unused network resources.

In an embodiment, the one or more core network functions may comprise a policy control function (PCF, PCRF), and the processor subsystem (of the SMGF) may be configured to request the policy control function to establish a quality-of-service (QoS)-based service guarantee for the transport of the data stream via the select one or more network links.

Such QoS-based service guarantees may take effect quickly, and may therefore be well-suited for use-cases that include frequent changes, e.g., to preferred bandwidths of data stream(s), and/or for use-cases that desire such service guarantees to be established quickly.

In an embodiment, the one or more core network functions may comprise a network management function (NSMF, CSMF), and the processor subsystem of the SMGF may be configured to request the network management function to establish the service guarantee via allocation or configuration of a network slice for the transport of the data stream.

Changes in network slice allocation and/or configuration (which are also jointly simply referred to as 'network slice configuration') may take effect more slowly than changes in QoS, and may therefore be suitable for use-cases which do not involve frequent changes or do not require service guarantees to be established quickly. In some embodiments, QoS-based service guarantees may be used to accommodate more momentary changes, while network slice configuration-based service guarantees may be used to accommodate more structural changes. In some embodiments, forecasting techniques may be used to estimate structural changes, for example based on current or past stream information received from the SFU.

In an embodiment, the processor subsystem of the SMGF may be configured to:
 request the one or more core network functions to establish the service guarantee by requesting a second bandwidth to be allocated for the transport of the data stream via the select one or more network links; and
 determine the second bandwidth based on the first bandwidth.

While in some embodiments the SMGF may effectively 'forward' bandwidth information received from the SFU as a request to the one or more core network functions, in other embodiments, the SMGF may determine a (second) bandwidth for which a service guarantee is to be requested based on a (first) bandwidth communicated by the SFU. For example, the SMGF may determine the second bandwidth based on the first bandwidth and resource information indicative of a bandwidth allocation and/or bandwidth capacity of the select network link(s). Effectively, the SMGF may better match the requested bandwidth(s) to available resources, and in particular, may allow service guarantees to be requested which are more realistic given available resources, and/or which better balance resources between different data streams for which such bandwidth information is received and/or between different SFUs.

In an embodiment, the processor subsystem of the SMGF may be configured to determine the target bitrate based on at least one of:
 a response received from the one or more core network functions which is indicative of a guaranteed bandwidth; and
 a function of the first bandwidth and resource information indicative of a bandwidth allocation and/or bandwidth capacity of the select one or more network links.

If a response is received from the one or more core network functions to the request for service guarantees, the target bitrate may be determined based on said response. For example, if the response indicates a guaranteed bandwidth, the target bitrate may be determined to match the guaranteed bandwidth, or to be (slightly) below the guaranteed bandwidth. Likewise, if the response indicates that the service request is refused, the target bitrate may be determined by the SMGF as a feasible target bitrate given the currently available resources, e.g., the bandwidth allocation and/or bandwidth capacity of the select network link(s). In another example, if the response is not (yet) received, the SMGF may provide, what may be considered to be a 'temporary' target bitrate. The temporary target bitrate may be a conservative bitrate, in that it may be determined to be feasible given the currently available resources. If a response is then subsequently received, the SMGF may again provide a target bitrate which is based on the response, e.g., based on a guaranteed bandwidth.

In an embodiment, the network node or the distributed system may be configured as a network function (SMGF) of the communication network for providing a network function-based interface between the selective forwarding unit and the one or more core network functions. In another embodiment, the SFU may comprise the SMGF as an internal function. In another embodiment, the SMGF may be implemented as a function of a service provider. In another embodiment, the SMGF may be implemented as a function of the communication network (e.g., near or as part of the CSMF, NSMF, and/or PCF). In this case, the SFU may be configured to directly communicate with the SMGF of the communication network.

In a further aspect of the invention, a data structure may be provided defining stream information for use by an entity (e.g., SMGF) providing an interface between i) a selective forwarding unit and ii) one or more core network functions in a communication network for establishing service guarantees for data flows in the communication network.

The data structure may comprise at least one of:
 a network-level address indicative of a network link via which a data stream is transported in the communication network;
 a minimum required bandwidth for the transport of the data stream via the network link;
 a preferred bandwidth for the transport of the data stream via the network link;
 an allocated bandwidth for the network link; and
 a maximum expected bandwidth for the transport of the data stream via the network link.

It will be appreciated by those skilled in the art that two or more of the above-mentioned embodiments, implementations, and/or aspects of the invention may be combined in any way deemed useful.

Modifications and variations of any one of the network nodes, one of the distributed systems of network nodes, one of the methods and/or one of the computer programs, which correspond to the described modifications and variations of another one of said entities, may be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

FIG. 4 shows a conceptual overview of a Stream Management and Guidance Function (SMGF) as an interface between the mobile network and SFUs;

FIG. 5 shows a conceptual overview of operations of the SMGF;

Figure 1:
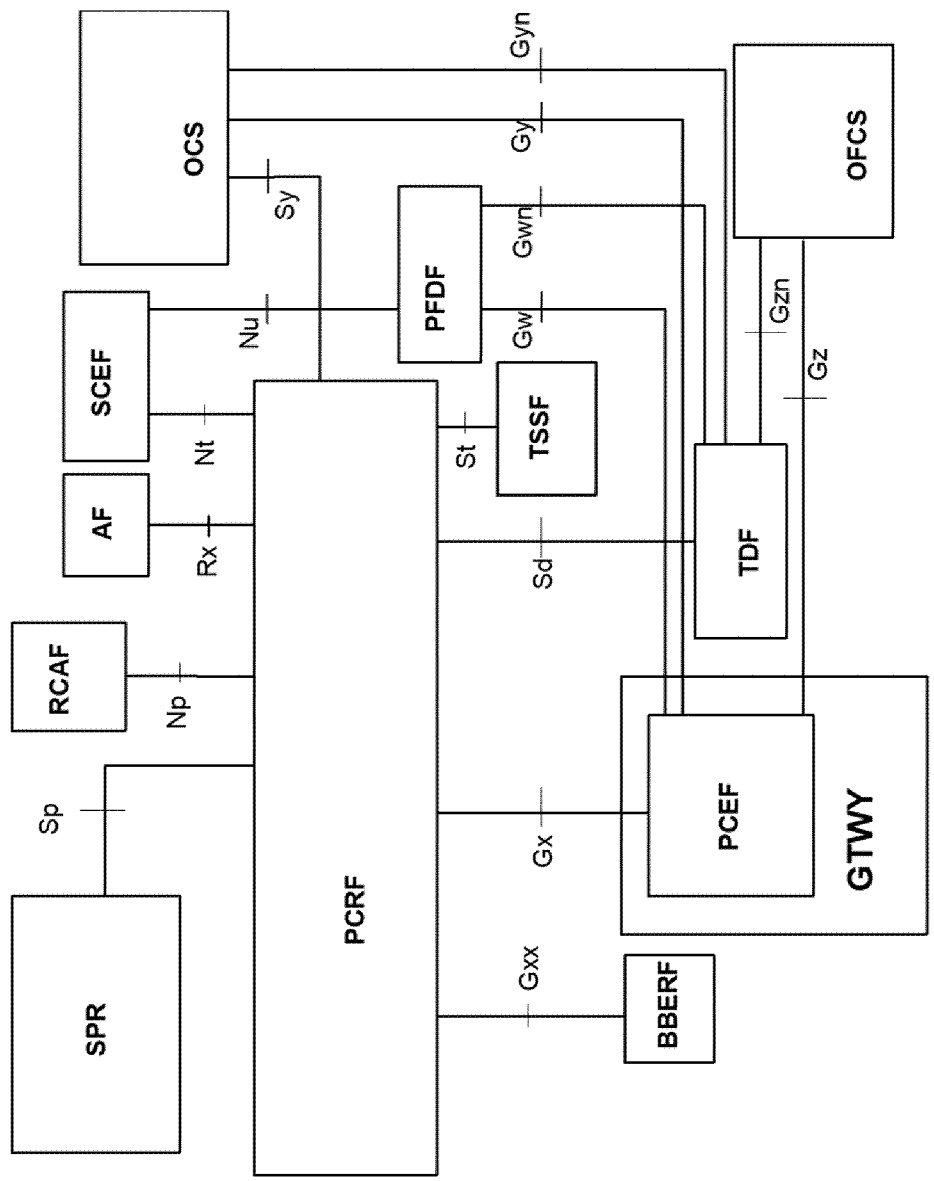
FIG. 1 shows an overview of the Policy and Charging Control (PCC) architecture as specified in 3GPP TS 23.203 (v15.4.0)

It should be noted that items which have the same reference numbers in different figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.
AF Application Function
AMF Access and Mobility Management Function
BBERF Bearer Binding and Event Reporting Function
CHF Charging Function
GTWY Gateway
NAT Network Address Translation
NEF Network Exposure Function
NOP Network Operator
NWDAF Network Data Analytics Function
PCC Policy and Charging Control
PCEF Policy and Charging Enforcement Function
PCF Policy Function
PCRF Policy and Charging Rules Function
RCAF Radio Congestion Awareness Function
RTC Real-Time Communication
SCEF Service Capability Exposure Function
SFU Selective Forwarding Unit
SMF Session Management Function
SMGF Stream Management and Guidance Function
SPR Subscription Profile Repository
TDF Traffic Detection Function
TURN Traversal Using Relay NAT
OCS Online Charging System
OFCS Offline Charging System
QoS Quality of Service
UDR User Data Convergence
UE User Equipment
UPF User Plane Function
N4-N40, Np, Nt, Nu, Rx, S1, Sd, Sp, Sy interfaces
Gx, Gxx, Gy, Gyn, Gz, Gzn, Gw, Gwn interfaces
10-15 user equipment
20-23 network link
30-32 data stream
40 network part
50 selective forwarding unit
60 stream graph
100 mobile network
110 3GPP LTE/5G reference points
120 service guarantee management
130 SMGF
140 $3^{rd}$ party application interface
150 streaming guidance
160 WebRTC SFU
200 collect information on active streams
210 assign streaming bitrates
220 configure network
230 inform SFU of streaming bitrates
300 receive stream update
310 update stream graph
320 identify affected network links
325 decision
330 network links have aggregated bandwidth maximum
340 identify affected stream(s)
350 assign target bitrate(s)
360 request QoS
365 decision
370 request denied
380 inform WebRTC SFU
400 receive stream update
405 update stream graph
410 identify affected network slice(s)
415 identify affected stream(s)
420 assign (temporary) target bitrates
425 inform WebRTC SFU
430 forecast demand
435 decision
440 change triggered
445 determine required capacity
450 adapt network slice(s)
455 decision
460 request denied
465 await network slice changes
470 identify affected stream(s)
475 assign target bitrates
480 inform WebRTC SFU
500 network node configured as SMGF
510 network interface
520 processor subsystem
530 data storage
600 network node configured as SFU
605 user equipment
610 network interface
620 processor subsystem
630 data storage
700 method of facilitating real-time transport of data streams
710 receiving stream information from selective forwarding unit
720 requesting establishment of service guarantee
730 providing target bitrate to selective forwarding unit
800 method of selectively forwarding data streams
810 providing provide stream information to entity
820 obtaining target bitrate from entity
830 providing target bitrate to sender
900 computer readable medium
910 non-transitory data
1000 exemplary data processing system
1002 processor
1004 memory element
1006 system bus
1008 local memory
1010 bulk storage device
1012 input device
1014 output device
1016 network adapter
1018 application

DETAILED DESCRIPTION OF EMBODIMENTS

The following embodiments are described in the context of real-time transport of data streams based on WebRTC and the transport taking place via a communication network adhering to one or more 3GPP standards. It will be appreciated, however, that the concepts described in the following embodiments may equally apply, mutatis mutandis, to any other type of real-time transport of data streams and any other type of communication network with core network functions capable of performing the functions as defined by the wording of the claims.

Figure 2:
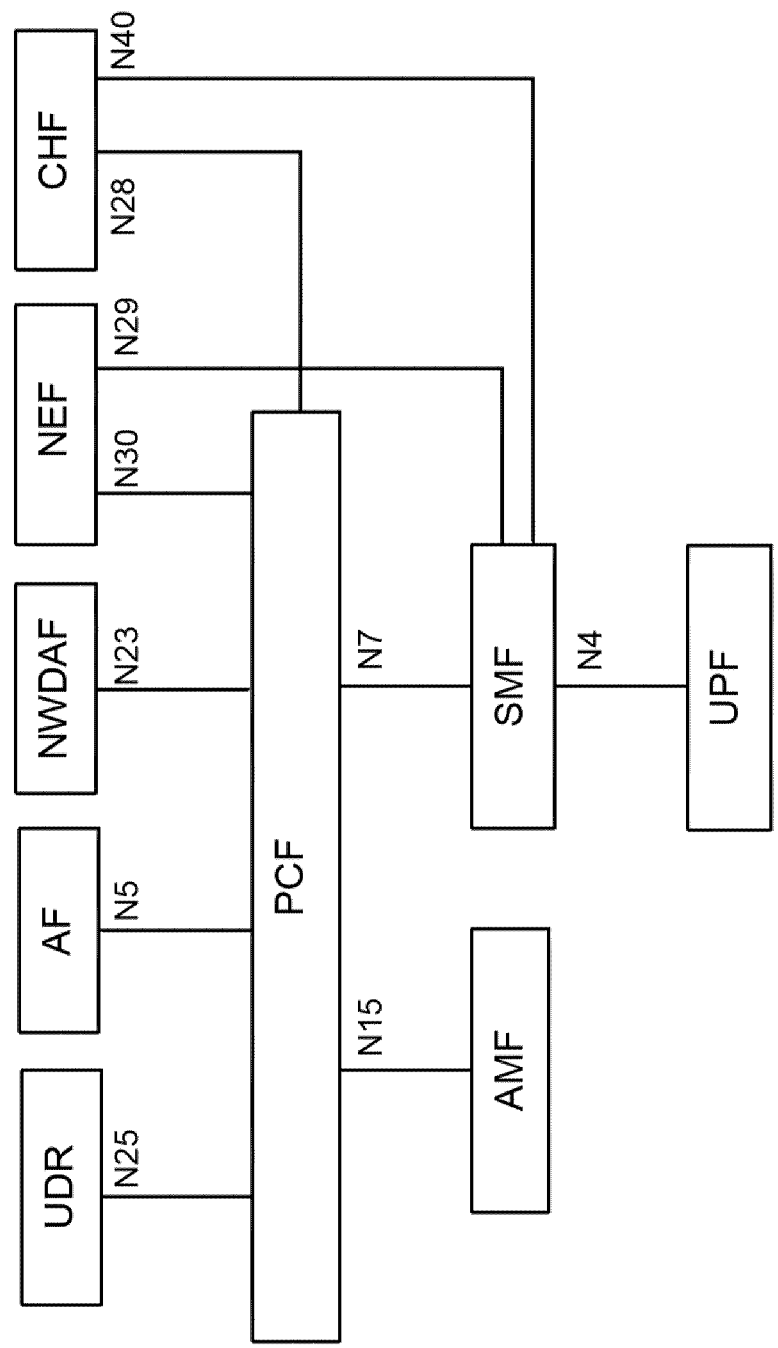
FIG. 2 shows an overview of the 5G Policy framework architecture as specified in 3GPP TS 29.513 (v15.1.0)

FIGS. 1 and 2 describe general mechanisms for providing service guarantees in a 3GPP network using core network functions of the 3GPP network to establish QoS and/or to provide service guarantees using network slice allocation and/or configuration.

FIG. 1 shows an overview of the Policy and Charging Control (PCC) architecture as specified in 3GPP TS 23.203 (v15.4.0). In 3GPP Long Term Evolution (LTE) networks, it is known to provide QoS as a service guarantee. QoS may in such networks be provided through a set of bearers. A bearer may be considered a traffic flow identification method that allows for special treatment of traffic. Bearers may be implemented between User Equipment (UE) and the PDN Gateway (PGW) through Evolved Packet System (EPS) bearers, which may be a combination of radio bearers, S1 bearers, and S5/8 bearers. When a UE connects to a Packet Data Network (PDN), one default EPS bearer may be established. This bearer may exist through the entire PDN session to provide IP connectivity to the PDN. As specified in the Policy and Charging Control (PCC) architecture in 3GPP TS 23.203 (v15.4.0), traffic in the default bearer may not receive special treatment. QoS may be implemented through dedicated bearers, which may be dedicated tunnels for specific traffic. For a dedicated bearer, the QoS Class Identifiers (QCIs) may specify forwarding treatment for packets in that specific bearer. Dedicated bearers may be established with a Guaranteed Bitrate (GBR) and non-GBR.

As shown in FIG. 1, Application Functions (AFs), which may be $3^{rd}$ party AFs, may specify QoS parameters (QCI, GBR, etc.) as PCC rules through the Rx reference point of the Policy and Charging Rules Function (PCRF) in the LTE core network.

According to 3GPP TS 23.501, the 5G QoS model is based on QoS Flows, which may support both GBR flows and non-GBR flows. Within a PDU session, QoS Flows may be identified using QoS Flow IDs (QFIs), where flows with the same QFI may receive similar treatment within a PDU session. QoS may be controlled by the Session Management Function (SMF). QoS Flows may be treated differently based on their QoS Profile, which, among other parameters, may include a 5G QoS Identifier (5QI; similar to the QCI used in LTE), and a Guaranteed Flow Bitrate (GFBR) and Maximum Flow Bitrate (MFBR) for GBR QoS Flows.

FIG. 2 shows an overview of the 5G Policy framework architecture as specified in 3GPP TS 29.513 (v15.1.0). Here, AFs may specify QoS parameters for QoS flows using the N5 reference point of the Policy Control Function (PCF). The N5 reference point may be be similar to the Rx reference of the PCRF in LTE, and AFs that are compatible with the Rx reference point may interact with the PCF directly, see, e.g., 3GPP TS 23.203.

In view of the similarities between the PCRF and PCF, they will be used interchangeability (as PCRF/PCF) in the following, and may in general be considered as policy control functions via which a QoS-based service guarantee may be established.

Besides QoS, 5G networks may also offer WebRTC streams service guarantees and separation through so-called network slices. Network slices may offer a virtual isolated network which may be customized to the Quality of Service requirements of the applications. According to 3GPP TR 28.801 (v15.1.0), network slice management may be performed by a Communication Service Provider (CSP), for example through the following two functions that may be provided by a Network Operator (NOP):

Network Slice Management Function (NSMF): The NSMF may allow the creation, configuration, and termination of Network Slice Instances (NSIs).

Network Slice Subnet Management Function (NSSMF): The NSSMF may allow for the creation, configuration, and termination of Network Slice Subnet Instances (NSSIs) in which specialized network functions can be deployed.

The NSMF may be available to a CSP. CSPs may offer a (limited) interface to Communication Service Customers (CSCs) in the form of the Communication Service Management Function (CSMF), see, e.g., 3GPP study item TR 28.801:

Communication Service Management Function (CSMF): The CSMF may allow a CSC to specify the service requirements for a network slice and translates these service requirements into network slice related requirements. The CSMF may trigger a reconfiguration of an NSI and NSSI when the service requirements change.

The relation between the different management functions related to network slices, as proposed in 3GPP TR 28.801 (v15.1.0), may be the following: a CSMF may delegate to a NSMF which may delegate to a NSSMF.

In general, core network functions such as the NSMF and CSMF may be considered network management functions which enable establishments of service guarantees for the transport of data stream(s) via allocation or configuration of a network slice.

Figure 3:
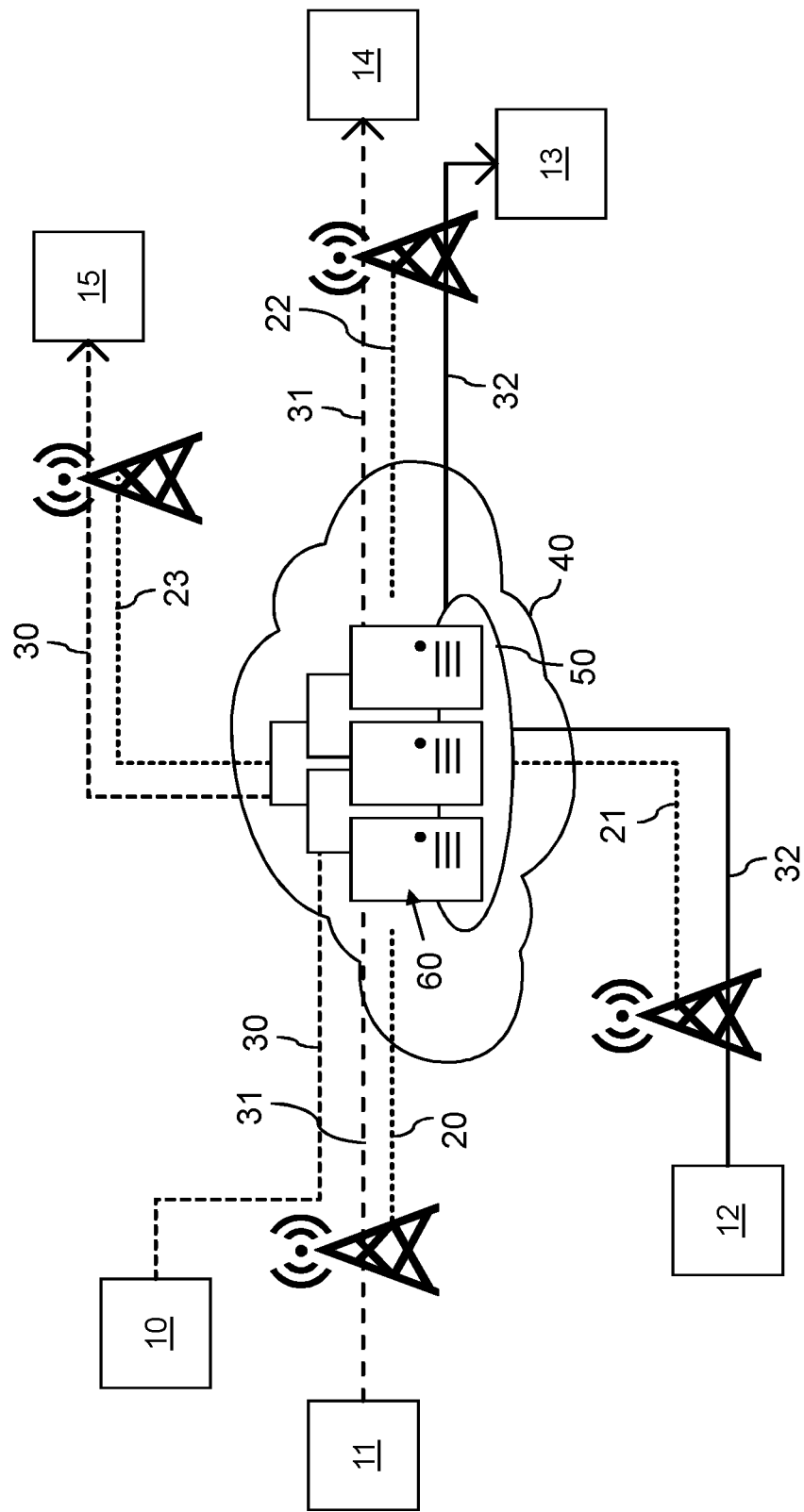
FIG. 3 shows an overview of a Selective Forwarding Unit (SFU) forwarding data streams between User Equipment (UE), wherein the data streams are transported via network links, and wherein several data streams share a network link.

FIG. 3 shows a WebRTC Selective Forwarding Unit (SFU) 50 forwarding data streams 30-32 between User Equipment (UE) 10-15. The data streams may be transported via network links 20-23, and several data streams may share a network link. In this particular example, three UEs 10-12 may represent sending WebRTC clients which each stream one data stream 30-32 via the SFU 50 and a network part 40, with the SFU 50 then selectively forwarding the data streams 30-32 to a receiving WebRTC client 13-15. Network link 22 may be shared by data streams 31 and 32, while network link 23 may only be used for data stream 30.

FIG. 4 shows a conceptual overview of a Stream Management and Guidance Function (SMGF) 130 as an interface between a mobile network 100 and WebRTC SFUs 160. The SMGF 130 may act as an interface or 'broker function' and interacts with the mobile network 100 on the one side, and with WebRTC SFUs 160 on the other side. Consistent with the role as broker, the roles and responsibilities of the SMGF 130 may be twofold:

1. Manage service guarantees in the mobile networks through the reference points of the 3GPP LTE and 5G systems (depicted as 'Service Guarantee Management 120'), and 2. Guide WebRTC clients (depicted as 'Streaming Guidance 150'), by collecting information about the current load and requirements of RTC streams, and providing information about optimal streaming bitrates and bandwidth availability, for example through a third-party application interface 140 between the SMGF 130 and WebRTC SFUs 160.

FIG. 5 shows a conceptual overview of operations of the SMGF of FIG. 4. Using the application interface, WebRTC SFUs may provide the SMGF with updates about the RTC streams that they handle in an operation titled 'Collect information on active streams' 200. This may allow the SMGF to collect information about the endpoints and the bandwidth requirements for each stream, and track changes over time. In some embodiments, the SMGF may use the information about the streams to create a so-called stream graph, which may be mapped on the underlying network infrastructure. The stream graph and network mapping may help the SMGF to determine which network links are used for RTC and which WebRTC streams share a network link. Using the mapping and based on agreements between the WebRTC service provider and the network operator, or otherwise, the SMGF may assign target bitrates to each stream in an operation titled 'Assign streaming bitrates' 210, e.g., to try to satisfy the individual streaming requirements while not exceeding the aggregated bandwidth maximums for concurrent streams. In some embodiments, when assigning the target bitrates, the SMGF may take into account both the path from sending client to the SFU, and the paths from the SFU to the receiving clients. In other words, both the uplink and downlink bandwidth availability may affect a stream's target bitrate. Based on the target bitrates, the SMGF may configure the network links through the 3GPP LTE/5G reference points in an operation titled 'Configure network' 220 and may signal the SFU the guaranteed bandwidth per stream in an operation titled 'Inform SFU of streaming bitrates' 230. The SFU, in turn, may instruct the WebRTC clients to adjust their streaming bitrates (not shown in FIG. 5). When a WebRTC SFU changes one of the streams (e.g., add a new stream, attach a new WebRTC client to a stream, or change the bandwidth preferences for a stream), the process described above may be repeated.

Data Structure

In some embodiments, the SMGF may maintain data structures associated with the collected information on the active streams. Such information may for example include the connected client endpoints, the currently active streams, and the current quality of service agreements per network link. The information for the connected endpoints may include, but is not limited to, on or more of the following types of information:
Application-level endpoint identifier,
Application-level client identifier,
Network-level endpoint address (e.g., IP-address, transport protocol, and port number),
(If a relay is used, see also below) Network-level address of relay (e.g., IP-address, transport protocol, and port number).

If a WebRTC client receives more than one stream, or if a client is both a sender and a receiver, the client may be listed as multiple endpoints in the data structure.

It is noted that a network-level address of a relay server may be specified, for example when a TURN server is used to connect an SFU to a WebRTC peer. When using a TURN server, the network-level endpoint address may be the address that the WebRTC client uses when connecting to the TURN server. The network-level address of the relay may be the address of the TURN server that is used on the connection with the SFU.

Example 1. An example of an endpoint data structure in JSON format, with three endpoints "e1", "e2", and "e3" and where and points "e1" and "e2" belong to the same client "c1" and where endpoint "e3" is making use of a TURN server, is given below:

```
{
    "endpoints":
    [{
        "id": "e1",
        "client": "c1",
        "address": "250.142.4.116",
        "port": "UDP/49153"
    },
    {
        "id": "e2",
        "client": "c1",
        "address": "250.142.4.116",
        "port": "UDP/49268"
    },
```

-continued

```
    {
        "id": "e3",
        "client": "c2",
        "address": "233.85.25.238",
        "port": "TCP/56213"
        "relay":
        {
            "address": "128.66.222.55",
            "port": "TCP/61172"
        }
    }]
}
```

The information for the currently active streams may include:
Application level stream identifier,
Application level endpoint identifier of the sender
List of application level endpoints of the receivers
Network service requirements (e.g., minimum required bandwidth or maximum latency).

The number of senders may be limited to one sender per stream. The number of receivers of the stream may be variable. Many-to-many communication may be represented as multiple streams, each with multiple receivers.

Examples of network service requirements which may be specified in the data structure include, but are not limited to, the following:
Minimum required bandwidth: the minimum bandwidth in bit/s of an RTC flow that may be required for the RTC application to function;
Preferred bandwidth: the bandwidth in bit/s of an RTC flow such that the RTC application may optimally function;
Current bandwidth: the bandwidth in bit/s that may be made available by the SMGF to an RTC flow;
Maximum expected bandwidth: the maximum bandwidth in bit/s of an RTC flow that the RTC application may request for an RTC flow (e.g., to allow for dynamically changing the streaming bitrate of RTC flows);

Example 2. An example of the data structure for active streams in JSON format, with two streams of which stream "s1" is a one-to-one stream and stream "s2" has multiple receivers, is given below:

```
{
    "streams":
    [{
        "id": "s1",
        "sender": "e1",
        "receivers": ["e3"],
        "qos":
        {
            "min-bw": 240000,
            "preferred-bw": 1200000,
            "current-bw": 1200000,
            "max-bw": 2200000,
        }
    },
    {
        "id": "s2",
        "sender": "e2",
        "receivers": ["e1", "e3", "e4"],
        "qos":
        {
            "min-bw": 360000,
            "preferred-bw": 1800000,
            "current-bw": 1650000,
            "max-bw": 1800000,
        }
    }]
}
```

It is noted that in this example, the current available bandwidth for an RTC flow does not necessarily have to match the preferred bandwidth. Namely, the SMGF may deviate from the preferred bandwidth when it may not deliver the service guarantee.

The data structure with the information about the current QoS agreements per network may include, but is not limited to:

Network identifier,
List of endpoints that are associated with the network,
QoS agreement.

In some embodiments, the QoS agreement may be specified on the bases of flows. The parameters that form the specification of the QoS agreement may then become:

Current maximum bandwidth per flow: The maximum bandwidth in bits/s that the SMGF may assign to a WebRTC stream at current time;

Absolute Maximum bandwidth per flow: The maximum bandwidth in bits/s for WebRTC streams, specified based on an agreement between the application service and a network operator or CSP;

In other embodiments, the QoS agreement may be specified on the basis total (e.g., aggregated) bandwidth usage of the service in a network. The QoS agreement specification may then include, but is not limited to:

Current maximum aggregated bandwidth: The maximum aggregated bandwidth in bits/s that the SMGF may assign to all WebRTC streams in a network combined, at current time;

Absolute maximum aggregated bandwidth: The maximum aggregated bandwidth in bits/s for WebRTC stream combined, specified based on an agreement between the application service and a network operator or CSP.

Based on the aggregated bandwidth, the SMGF may derive the maximum bandwidth per flow. By using aggregated bandwidth instead of per-flow maximums, the SMGF may have more flexibility in dividing the available bandwidth over the active flows. When needed, the QoS agreement may also be a combination of per-flow and aggregated bandwidth.

It is noted that for both the maximum per flow bandwidth and the aggregated bandwidth, the current maximum bandwidth may not exceed the absolute maximum bandwidth. Differentiation between current and absolute maxima may allow for efficient resource usage when the load on the networks is lower than agreed on with the network operator or CSP.

QoS agreements for the uplink and downlink do not have to be the same, and therefore may be specified separately.

Example 3. An example of the data structure for agreements between a network operator or CSP and a third-party WebRTC service in JSON format, with two agreements for networks "n1", and "n2", where the agreement for "n1" is specific on per-flow basis and the agreement for "n2" is specified on the basis of a maximum aggregated maximum, is:

```
{
    "agreements":
    [{
        "network": "n1",
        "endpoints": ["e1, e2"],
        "qos":
        {
            "uplink":
```

-continued

```
            {
                "stream-bw": XX,
                "max-stream-bw": XX,
            },
            "downlink":
            {
                "stream-bw": XX,
                "max-stream-bw": XX,
            }
        },{
        "network": "n2",
        "endpoints": ["e3"],
        "qos":
        {
            "uplink":
            {
                "aggr-bw ": XX,
                "max-aggr-bw": XX
            },
            "downlink":
            {
                "aggr-bw ": XX,
                "max-aggr-bw": XX
            }
        }]
}
```

Application Interface

The SMGF may provide (e.g., 'expose') an API to the WebRTC SFU for specifying the service requirements. The API may, for example, include the following functions:

endpoint_add, this function may be used by the WebRTC SFU to add an endpoint to the list of endpoints in the SMGF. When using this function, the SFU may specify an application level endpoint identifier, a client identifier, a network level address, and optionally the network level address of a TURN server. Using this function more than once with the same endpoint identifier may update (override) the current configuration. Using this function more than once with the same client identifier may add another endpoint for the same client.

Example 4. An example use of this function, where an endpoint is added that directly connects to the SFU (network-level address of the TURN server is set to NULL), is:
endpoint_add("e1", "c1", "250.142.4.116", "UDP/49153", NULL)

Example 5. An example of the use of this function, where the network-level address for a TURN server is specified, is:
endpoint_add ("e3", "c2", "233.85.25.238", "TCP/56231", relay)
where relay is an (optional) object with the following data structure:

```
"relay":
{
    "address": "128.66.222.55",
    "port": "TCP/61172"
}
```

Failing to specify the endpoint identifier, client identifier, and network-level address may result in not adding the endpoint to the list of identifiers and an error response.

endpoint_remove, this function may be used by the WebRTC SFU to remove an endpoint from the list of endpoints in the SMGF. The SFU may specify the endpoint identifier of the endpoint that has to be removed. Specifying a non-existing endpoint identifier may result in an error response. Endpoints that are associated as receiver of a stream may be automatically detached from the stream. When an endpoint that is a sender of a stream is removed, the stream may have to be removed first using the stream_remove function, or this function call may result in an error response.

Example 6. An example of the use of this function is:
endpoint remove ("e3")
client_add, this may be a convenience function that may be used by the WebRTC SFU to add multiple endpoints associated to a single client to the list of endpoints maintained in the SMGF. Using this function multiple times with the same client identifier may: (1) add all endpoints that do not yet exists in the list of endpoints maintained by the SMGF, (2) when the update flag is set, update all endpoints that do exists in the list of endpoints maintained by the SMGF, and (3) when the cleanup flag is set, remove all endpoints that do exists in the list of endpoints maintained by the SMGF but are not specified in the function call.

Example 7. An example of the use of this function, where a client with identifier "c1", two endpoints, the update flag set, and the cleanup flag no set, is:
client add("c1", endpoints, true, false)
where endpoints may be an object with the following data structure:

```
"endpoints":
[{
    "id": "e1",
    "address": "250.142.4.116",
    "port": "UDP/49153"
}, {
    "id": "e2",
    "address": "250.142.4.116",
    "port": "UDP/49268"
}]
```

Similar to the endpoint_add function, WebRTC SFUs may also specify the network-level address of a TURN server.

Example 8. An example of the use of this function, where a client with identifier "c3", one endpoint including the network-level address of a TURN server, the update flag set, and the cleanup flag set, is:
client add("c3", endpoints, true, true)
where endpoints may be an object with the following data structure:

```
"endpoints":
[{
    "id": "e3",
    "address": "233.85.25.238",
    "port": "TCP/56213"
    "relay":
    {
        "address": "128.66.222.55",
        "port": "TCP/61172"
    }
}]
``` client_remove, this is a convenience function that may be used by the WebRTC SFU to remove all endpoints associated with a client from the list of endpoints maintained in the SMGF. Specifying a client identifier that does not exist may result in an error response.

Example 9. An example use of this function is:
clinet_remove("c2")
stream_add, this function may be used by the WebRTC SFU to add a new stream to the list of streams that is maintained by the SMGF. The WebRTC SFU may specify the sending endpoint and the service guarantees that it wishes to receive from the network. Specifying an endpoint that does not exist in the list of connected endpoints maintained by the SMGF, or specifying inconsistent service guarantees, may result in an error response.

Example 10. An example use of this function is:
stream add("s1", "e1", qos)
where qos may be an object with the following data structure:

```
"qos":
{
    "min-bw": 240000,
    "pref-bw": 1200000,
    "max-bw": 2200000,
}
```

Regarding the qos, the following conditions may apply: all values must be non-negative integers, min-bw must be smaller than or equal to max-bw, pref-bw must be greater than or equal to min-bw, and pref-bw must be smaller than or equal to max-bw. Specifying inconsistent service guarantees may result in an error response.

Calling this function multiple times with the same stream identifier may update (override) the stream specification currently known by the SMGF.

stream_remove, this function may be used by the WebRTC SFU to remove a stream from the list of streams maintained by the SMGF. The WebRTC SFU may specify the identifier for the stream that has to be removed. Specifying a stream identifier that does not exists in the SMGF may result in an error response.

Example 11. An example use of this function is:
stream remove("s1")
stream_update_bw, this function may be used by the WebRTC SFU to change the preferred bandwidth for the specified stream. Specifying a stream that does not exists, or specifying a bandwidth that is inconsistent with the service guarantee specification (see description of the stream_add function), may result in an error response.

Example 12. An example use of this function, where the preferred bandwidth of stream "s1" is updated to 2.2 Mbit/s, is:
stream update bw("s1", 2200000)
stream_attach_receivers, this function may be used by the WebRTC SFU to attach one or more receiving endpoints to a stream. The WebRTC SFU may specify the stream identifier and provide a non-empty list of endpoint identifiers. Specifying a non-existing stream, or non-existing endpoint, may result in an error response.

Example 13. An example use of this function, where three endpoints are added to stream "s2", is:
stream_attach_receivers(endpoints)
where endpoints may be an object with the following data structure:
"endpoints": ["e1", "e3", "e4"]
stream_detach_receivers, this function may be used by the WebRTC SFU to remove endpoints from the list of receivers of a stream. The WebRTC SFU may specify the stream identifier, and a non-empty list of receiving endpoints that have to be removed. Specifying a non-existing stream, or non-existing endpoint, may result in an error response.

Example 14. An example use of this function, where two endpoints are removed from stream "s2", is:
stream_detach_receivers(endpoints)
where endpoints may be an object with the following data structure:
"endpoints": ["e1", "e4"]
streams_get, this function may be used by the WebRTC SFU to retrieve information about streaming bitrates of the WebRTC flows (e.g., the current-bw element in the active streams data structure). By default, this function may return information about all active streams. The SFU may optionally specify a list of stream identifiers to limit the information that is returned. This function may be used to request changes to the streaming bitrates, specifically after making modifications using the functions described above.

Example 15. An example use of this function, where the WebRTC SFU requests information about the streaming bitrates for two streams "S1" and "s2", is:
streams_get(streams)
where streams may be an optional object with the following data structure:

An example response from the SMGF, which contains information about the bitrates of streams "s1" and "s2" in JSON format, is:

```
{
  "streams":
  [{
    "id": "s1",
    "bitrate": "1200000",
  },{
    "id": "s2",
    "bitrate": "1650000",
  }]
}
```

Application Interface Protocol

The interface between the SMGF and WebRTC SFUs may be on request/response basis, or using a bi-directional communication channel.

Request/Response Interface

In some embodiments, the interface between the SMGF and WebRTC SFUs may follow a request/response-based communication scheme, for example through the implementation of an HTTP-based Representational State Transfer (REST) API. The HTTP "GET", "POST", "PUT", "PATCH" and "DELETE" methods may be used for retrieving, adding, and removing data from the SMGF.

Example 15. An example use of the HTTP-based application interface, where endpoints "e1", "e3", and "e4" are added to stream "s1", is:

```
POST /streams/s1/receivers HTTP/1.1
Host: network.example.org
Content-Type: application/json
Content-Length: 37
{
  "endpoints": ["e1", "e3", "e4"]
}
```

In this example, the list of endpoints is provided in JSON format.

Example 16. An example use of the HTTP-based application interface, where the WebRTC SFU updates the preferred streaming bitrate for stream "s1", is:

```
PATCH /streams/s1 HTTP/1.1
Host: network.example.org
Content-Type: application/x-www-form-urlencoded
Content-Length: 37
preferred-bw=1200000
```

In this example, the preferred bandwidth is provided as form-data in the request body. This may be an alternative encoding to JSON.

Example 17. An example use of the HTTP-based application interface, where the WebRTC SFU removes endpoint "e1" from the SMGF, is:

```
DELETE /endpoints/e1 HTTP/1.1
Host: network.example.org
Content-Length: 0
```

The SMGF may return with an empty response on success, or a message in case of an error. WebRTC SFUs may then have to explicitly request the bitrates for active streams. Alternatively, the SMGF may return the bitrate for affected streams after making an update.

Bi-Directional Communication Channel

In some embodiments, the interface between the SMGF and WebRTC SFUs may be implemented using a bi-directional communication channel, for example a WebSocket connection. When using this interface, the communication between the SMGF and WebRTC SFUs may be based on messages. WebRTC SFUs may send messages to make updates. The SMGF may send messages to provide SFUs with changes to the bitrates of the active streams. Each message may contain elements to communicate the action type and its parameters. Such messages may be considered examples of 'stream information' as described elsewhere.

Example 18. An example of a message in JSON format, to be send over the bi-directional communication channel, where the message is used to add stream "s1" to the SMGF, is:

```
{
  "action": "stream_add",
  "stream":
  {
    "id": "s1",
    "sender": "e1",
    "qos":
    {
      "min-bw": 240000,
      "preferred-bw": 1200000,
      "max-bw": 2200000,
    }
  }
}
```

Function Logic

In some specific embodiments, one of the primary functionalities of the SMGF may be to translate the updates for WebRTC steams (e.g., requirements and preferences) which the SMGF receives from the WebRTC SFUs into a concrete network configuration. As part of this translation step, the SMGF may map the stream paths on the network infrastructure, such that the SMGF may determine which network links and streams are affected. It is noted that the network infrastructure may be identified by the SMGF in the form of a (static) configuration or through Software Defined Networking (SDN) techniques. Briefly speaking, based on this information, the SMGF may balance the availability of dedicated network resources, providing matching resources in the uplink and the downlink. Once resources are secured in the network, the SMGF may inform the WebRTC SFU, which, in turn, may inform the connected clients. For example, to balance the streaming bitrates and the network bandwidth guarantees, the following procedure may be used. (Step 1) For each network link, assign each stream that traverses that network link the minimum bandwidth. (Step 2) In case the network link can provide a larger guarantee than the assigned bitrates, divide the remaining capacity over the streams that have a higher preferred bandwidth, weighted by the difference between the preferred and the minimum bandwidth. (Step 3) Next, for each stream select the lowest assigned bitrate as the streaming bitrate. (Step 4) Then, for each network link compute the desired bandwidth guarantees by summing the streaming bitrates for streams that traverse the network link. (Step 5) In case the desired bandwidth guarantee for a network link are higher than the current guarantee, the bandwidth guarantees should be increased. When the desired bandwidth guarantee for a network is lower than the current bandwidth guarantee, it should be reduced. Note that when adjusting bandwidth guarantees is not instant (e.g., in the case of network slicing), a temporary bandwidth assignment can be made following the same procedure described above (i.e., steps 1, 2, and 3), using the current bandwidth guarantees as the network link maximum. It is noted that the above-described functionality of the SMGF, and various aspects thereof, are further described in the following.

Stream Graph to Network Infrastructure Mapping

The SMGF may be configured based on service agreements between WebRTC service providers and network operators. This agreement may specify which network guarantees the SMGF may provide for WebRTC streams (see under "Data Structure" for an example agreement). The SMGF may use the network level addresses of the WebRTC endpoints, and possibly the network level addresses of a TURN server, to link the endpoints and relays to network links. After receiving an update to one of the streams (e.g., a new stream, changing the preferred streaming bitrate, or attaching a receiving endpoint to a stream), the SMGF may have to identify which network links are affected. Because a stream extends both in the direction of the uplink and at least one downlink, multiple network links may be affected by an update. To identify the affected network links, the SMGF may construct a stream graph, which provides a mapping between the paths of the streams and the network links.

Example 19. An example stream graph and network infrastructure mapping are shown in FIG. 3, here schematically indicated by the reference numeral 60.

Balancing Uplink and Downlink Network Guarantees

When both sending and receiving endpoints make use of the mobile network, and the endpoints make use of networks for which the SMGF has an agreement with the NOP or CSP, it may be desirable that the network guarantees that are provided for the uplink match those of the downlink, and vice versa. Therefore, the SMGF may continuously or periodically adjust the network configuration to balance the guarantees for uplink and downlink.

The strategy for balancing the guarantees may depend on the type of agreement between the NOP/CSP and the SMGF, the availability of network resources, and the bitrate preferences for the WebRTC streams. When an agreement is based on the bandwidth per stream, without a maximum of number of streams or an aggregated (e.g., total) bandwidth usage, the SMGF may balance the uplink and downlink network guarantees based on the network link that can provide the least bandwidth. When agreements are based on aggregated bandwidth, for example when network guarantees are provided through network slicing, balancing guarantees potentially involves several streams and network links. The optimal division of bandwidth may, for example, be found using dynamic programming techniques or the procedure outlined in 'function logic'.

In both cases, the SMGF may, by being appropriately configured, try to satisfy the preferred streaming bitrates as they are specified by the WebRTC SFU. In an optimal scenario, the SMGF may configure the desired bandwidth guarantees. If the bandwidth guarantees fall within the agreement with the NOP/CSP, it is likely that the request for bandwidth guarantees is honored by the mobile network. However, in cases of high load on the network and conflicting agreements with other services, the mobile network may not be able to satisfy the request. When the request of the SMGF is denied, the SMGF may try to obtain network guarantees for a lower bandwidth. The SMGF may inform the WebRTC SFU about the current state, so that the WebRTC service may optimally use the available bandwidth. The SMGF may do so by providing a target bitrate for each stream. The target bitrate may the maximum bitrate that WebRTC clients can use, for which bandwidth guarantees are provided for in the network.

Network Configuration

The role of the SMGF towards the mobile network may be to configure sufficient resources for WebRTC streams. Depending on the agreement towards the WebRTC service, the SMGF may have several options to realize the network performance guarantees, e.g.:

Quality of Service: In some embodiments, the SMGF may act as a broker between the WebRTC SFU and the policy control functions, or specifically the policy and charging functions in the mobile network (e.g., the PCRF and PCF). By configuring QoS, the SMGF may provide WebRTC streams with sufficient bandwidth and enable low-latency delivery. This option may be suitable for use cases that include frequent changes to the preferred streaming bitrate and use cases in which those changes have to be effective quickly.

The SMGF may select QoS mechanisms for providing network guarantees when a minimum bandwidth has to be guaranteed, but there may be no other requirement for the service to separate WebRTC traffic from other traffic in the mobile network. Depending on the type of mobile network, the SMGF may configure QoS bearers or QoS Flows. When one of the network links is LTE, the SMGF may configure a dedicated bearer, e.g., with QCI value 2 (Conversational Video/Live Streaming) and a GBR matching the target bitrate, for each of the streams that are using this network link. When a network link is 5G, a QoS Flow with similar properties as the dedicated bearer (e.g., 5QI value 2) may be configured for each stream.

Figure 6:
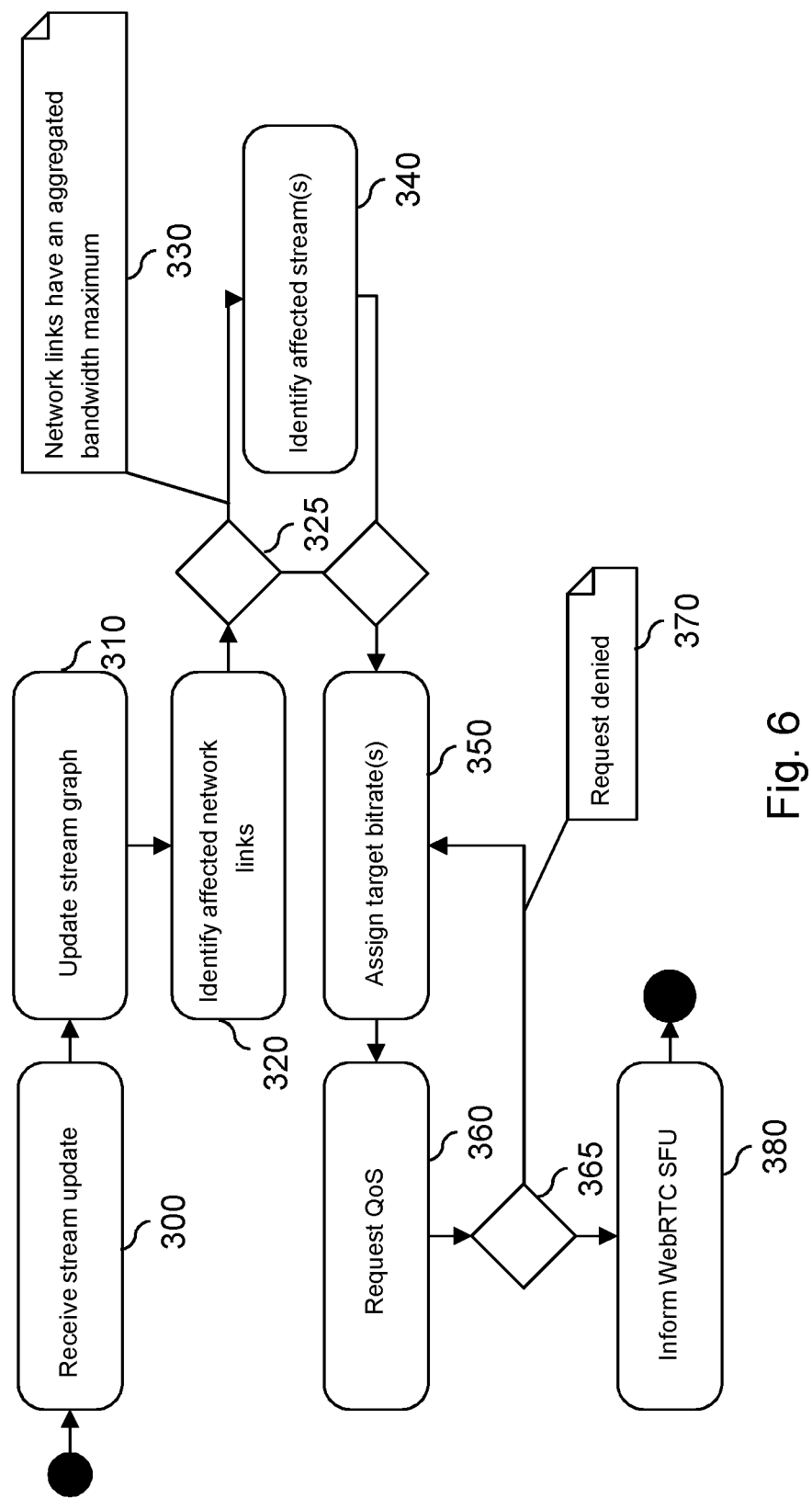
FIG. 6 shows a flowchart which depicts actions and/or event occurrences when the
 SMGF receives a stream update from the SFU.

FIG. 6 shows a flowchart which depicts actions and/or event occurrences when the SMGF receives a stream update from the SFU. In this example, the SMGF receives an update to one of the streams from the WebRTC SFU through the third-party application interface of the SMGF. In general, such stream updates may include adding/removing a stream, attaching/detaching endpoints, or updating the bitrate preference. The flow may be as follows:

1. Once the SMGF receives a stream update in a process step titled 'Receive stream update' 300, the SMGF may update its internal data structure and the stream graph in a process step titled 'Update stream graph' 310.
2. Using the stream graph, the SMGF may identify which network links are affected by the stream update in a process step titled 'Identify affected network links' 320.
3. Depending on whether there are agreements with the NOP/CSP on the maximum aggregated bandwidth for a WebRTC service on the affected network links (see decision 325 and decision outcome titled 'Network links have aggregated bandwidth maximum' 330), the SMGF may identify concurrent WebRTC streams that might be affected by the stream update (e.g., when the maximum aggregated bandwidth will exceed the agreement) in a process step titled 'Identify affected stream(s)' 340.
4. For each affected stream, the SMGF may assign a target bitrate in a process step titled 'Assign target bitrate(s)' 350, for example to try to satisfy the preferred streaming bitrate as much as possible.
5. The SMGF may request/update QoS in a process step titled 'Request QoS' 360, for example using the Rx/N5 reference points of the mobile network system. It is noted that the SMGF may request matching QoS for the uplink and downlink paths between the WebRTC clients and the SFU.
6. When the mobile network cannot satisfy the requested QoS (e.g., when a mobile cell is loaded heavier than expected), the mobile network may deny the SMGF its request (see decision 365 and decision outcome titled 'Request denied' 370). In this case, the SMGF may re-assign the target bitrates, taking into the current state of the network, in the earlier mentioned process step 370.
7. If the mobile network can satisfy and requested QoS and when the QoS is configured, the SMGF may inform the SFU about the new target bitrates for the affected streams in a process step titled 'Inform WebRTC SFU' 380.

Figure 7:
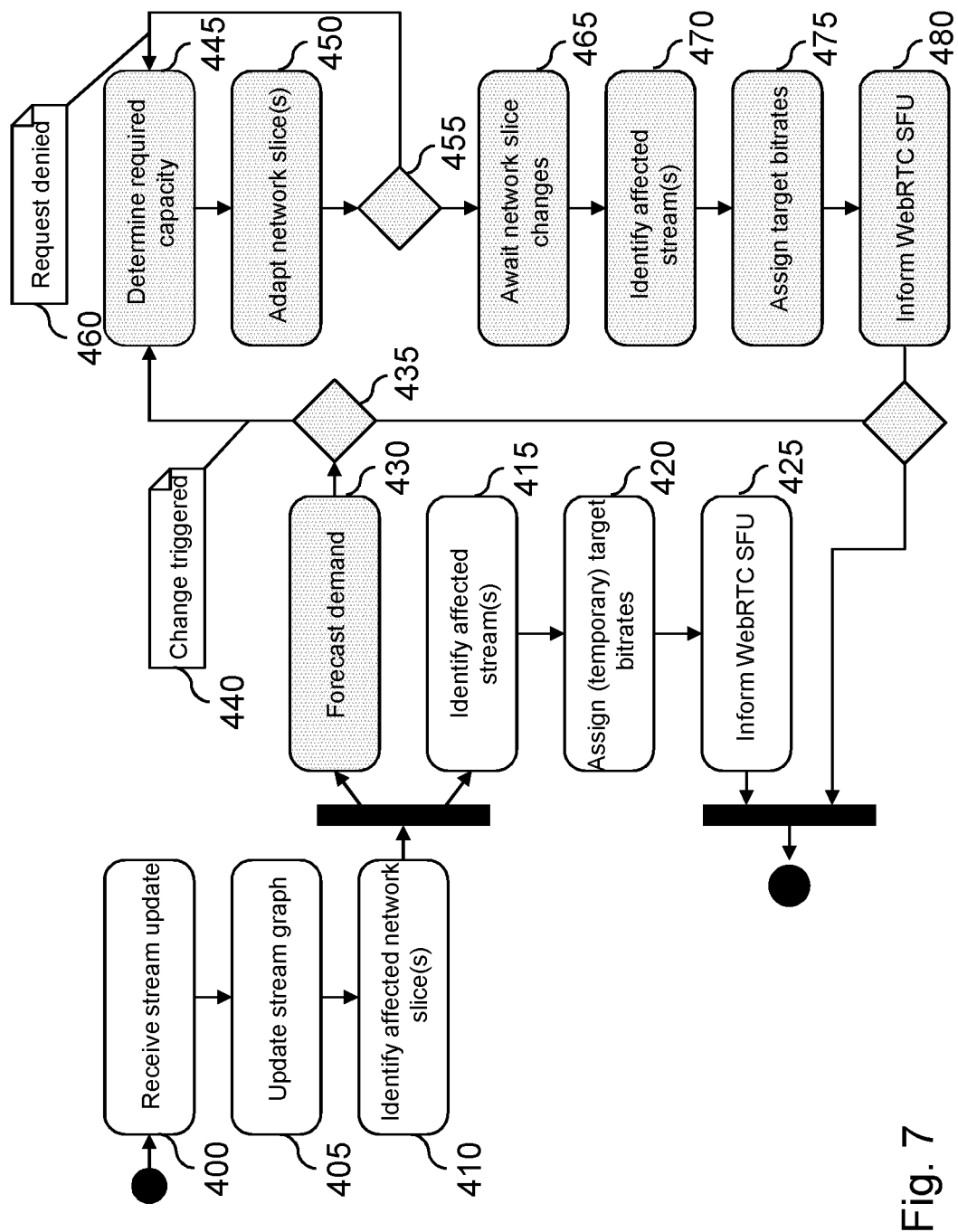
FIG. 7 shows a flowchart which depicts actions and/or event occurrences when the SMGF receives a stream update that affects one or more network slices.

It is noted that in FIGS. 6 and 7, diamonds without reference numerals indicate a merging of flows after a decision, and are also referred to as merge nodes, e.g., in UML activity diagrams, and indicate that there are two ways to reach this point but only one way forward.

Network slicing: In some embodiments, the SMGF may act as a broker between the WebRTC SFU and the network slice management functions. Changes made to a network slice might take time to be effective. Therefore, the SMGF may be configured to proactively monitor changes in the number and bitrate of active WebRTC streams. In some embodiments, the SMGF may determine when the capacity in a network slice should be increased/decreased based on an upper- and lower-threshold. In other embodiments, the SMGF may make use of machine learning techniques (e.g., time-series forecasting) to forecast the needed capacity.

The SMGF may configure network slices to provide network guarantees, for example when the WebRTC service requires separation of traffic between WebRTC streams and other traffic in the mobile network. In such cases, the WebRTC clients may be trusted to follow the instruction from the WebRTC SFU, and the streams may not need individual QoS to guarantee bandwidth within the network slice. The capacity in a network slice may be fixed, nevertheless changes to streams may occur frequently, although such frequent changes may be subject to the aggregated required bandwidth not changing rapidly (e.g., increasing the streaming bitrate of one stream while reducing the bitrate of another competing stream).

FIG. 7 shows a flowchart which depicts actions and/or event occurrences when the SMGF receives a stream update that affects one or more network slices. The flow may be:

1. The SMGF may receive an update to one of the streams from the WebRTC SFU, for example through the application interface of the SMGF. Such stream updates may for example include adding/removing a stream, attaching/detaching endpoints, or updating the bitrate preference.
2. Once the SMGF receives the stream update in a process step titled 'Receive stream update' 400, the SMGF may update its internal data structure and the stream graph in a process step titled 'Update stream graph' 405.
3. Using the stream graph, the SMGF may determine which network slices are affected by this update in a process step titled 'Identify affected network slice(s)' 410. It is noted that the SMGF may identify both the network slices that are used for streaming from the WebRTC clients to the SFU, and the network slices that are used for streaming from the SFU to the WebRTC clients.

Because adjusting network slices may take time (in some examples in the order of a few minutes), the SMGF may continue by operating on two sub-processes in parallel. The first sub-process may assign streaming bitrates, for example to handle the change when the network slice is not adapted, or to cover the time until the changes to the network slices are realized. The actions and events that occur in the first sub-process may include:

a. Using the information about the network slices that are affected by the stream update, the SMGF may identify which streams are also making use of those network slices in a process step titled 'Identify affected stream(s)' 415.
   b. Based on the current capacity of the network slices, the SMGF may assign each stream a target bitrate in a process step titled 'Assign (temporary) target bitrates' 420, e.g., to satisfy preferred streaming bitrate as much as possible.
   c. The SMGF may inform the WebRTC SFU about the new target bitrates of the affected streams in a process step titled 'Inform WebRTC SFU' 425.

In the second sub-process, the network slice(s) may be adapted, for example when significant changes in demand are expected. The actions and events that occur in the second sub-process may include:

a. By tracking stream updates, including the latest update, the SMGF may forecast near-future demand (for example, in the order of the next minutes) in the affected network slices in a process step titled 'Forecast demand' 430. If the current capacity of the network slices is still appropriate for handling current and future demand, the sub-process may terminate and the target bitrates assigned by the first sub-process remain valid (see decision 335).

b. When the forecast indicates a significant change in demand (see decision 335 and decision outcome titled 'Change triggered' 440, the SMGF may determine how the network slices have to be adjusted (e.g., increase/decrease the capacity of at least part of the affected network sliced) in a process step titled 'Determine required capacity' 445, e.g., taking into the expected demand and the agreements between the WebRTC service and the network operator.

c. The SMGF may request adjustments of the network slices in a process step titled 'Adapt network slice(s)' 450, for example through the NSMF or CSMF offered by the 5G mobile network. If the request is denied (see decision 455 and decision outcome titled 'Request denied' 460), the SMGF may repeat the above-described step "b" until a suitable configuration is found, or may terminate the sub-process when no suitable configuration can be found.

d. After requesting the changes to the network slices, the SMGF may await the network slice changes in a process step titled 'Await network slice changes' 365, for example by awaiting a signal from the NSMF/CSMF indicating that the network slice changes have been implemented.

e. Given the changes to the network slice capacities, the SMGF may identify which streams are affected and may need to change their streaming bitrates in a process step titled 'Identify affected stream(s)' 470.

f. Based on the new capacity of the network slices, the SMGF may assign each stream a target bitrate in a process step titled 'Assign target bitrates' 475, for example to satisfy the preferred streaming bitrate as much as possible.

g. The SMGF may inform the WebRTC SFU about the new target bitrates of the affected streams in a process step titled 'Inform WebRTC SFU' 480, thereby overriding the (temporary) target bitrates from the first sub-process.

Network slicing with QoS: In other embodiments, the SMGF may translate the streaming requirements into network slices, e.g., by allocating and/or configuring network slices, and may configure QoS through the PCFs of those network slices. This may be desirable when creating a dedicated WebRTC network slice, but when the clients may or cannot be trusted. This may be the case when multiple WebRTC services make use of the same network slice and QoS may be required to prevent competing services from using bandwidth that is supposed to be for another service. The process for handling a stream update may be similar to only using network slices, with the exception of an additional step of configuring QoS after assigning the target bitrates.

Client Connectivity: Depending on whether the client device and/or the network makes use of firewalls or NAT, WebRTC clients may connect to the SFU either directly (see 'direct connection' below) or using a relay (e.g., a TURN server, see 'relayed connection').

Direct connection: In some embodiments, WebRTC clients may connect directly to the SFU which may be located in the (LTE/5G) core network (e.g., in the form of an AF) or the SFU may be located in the NOP network (e.g., in a cloud computing facility from the NOP). In this case, the SMGF may offer network performance guarantees on the full path between the WebRTC clients and the SFU. When the SFU is located outside of the NOP network (e.g., in a public cloud or in facilities from the WebRTC service provider), the SMGF may offer network guarantees up until the gateway.

Relayed connection: In some embodiments, at least one of the WebRTC clients may connect to the SFU through a TURN server. When the TURN server is located close to the client (e.g., at the multi-access edge cloud), the SMGF may configure network guarantees in the Radio Access Network, from the UE to the edge. Furthermore, the SMGF may configure network guarantees in the LTE/5G Core Network or backhaul network to facilitate the link between the TURN server and the SFU. When the TURN server is located near the SFU, the SMGF may configure network guarantees on the path from the WebRTC client to the TURN server.

Use Cases: Relevant use cases include, but are not limited to, the following:

Use case 1: Team Video Conferencing and Collaboration

In one use case, the SMGF may support bi-directional many-to-many video communications where clients are both senders and receivers. The canonical use case is team conferencing and collaboration. Enterprises may use video conferencing between employees, partners, and customers.

Use case 2: Massive Video Surveillance

In another use case, the SMGF may support many-to-one unidirectional video streaming with a high number of senders. An example use case is massive video surveillance. Deploying a video surveillance infrastructure may be challenging due to high installation costs. A wireless surveillance system may provide a flexible alternative, with the surveillance cameras connected to the mobile network. Camera feeds may be uploaded to a mobile monitoring unit.

In this location, the camera feeds are monitored by people.

Use case 3: Autonomous Driving

In another use case, the SMGF may support many-to-many real-time communication of data streams. Self-driving cars may collect an exceptional amount of data which may have to be processed. Autonomous vehicles may exchange (part of) this data to better determine location and context, improving safety and robustness.

Data Processing Entities

Figure 8:
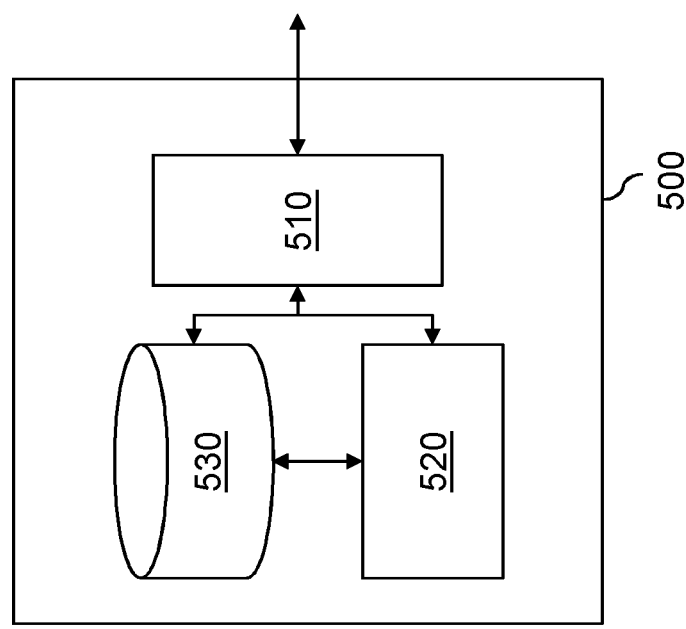
FIG. 8 shows a network node configured as an SMGF.

FIG. 8 shows a more detailed view of the SMGF 500, being in this example embodied by a single network node. It can be seen that the SMGF 500 may comprise a network interface 510 for communicating with other network nodes in the network. The network interface 510 may take any suitable form, including but not limited to a wired network interface based on Ethernet or optical fiber or a wireless network interface. FIG. 8 further shows the SMGF 500 comprising a storage 530, such as a hard disk, a solid-state drive, or an array thereof, which may comprise any of the described data structures maintained by the SMGF 500.

The SMGF 500 may further comprise a processor subsystem 520 which may be configured, e.g., by hardware design or software, to perform the operations described with reference to FIG. 3-7 and others in as far as pertaining to the SMGF. For example, the processor subsystem 520 may be embodied by a single Central Processing Unit (CPU), but also by a combination or system of such CPUs and/or other types of processing units.

In general, the SMGF 500 may be embodied by a (single) device or apparatus. For example, the SMGF 500 may be embodied by a single network node, e.g., a network server. The SMGF 500 may also be embodied by a distributed system of such devices or apparatuses. An example of the latter may be the functionality of the SMGF 500 being distributed over different network nodes of a network, for example using virtualization techniques.

Figure 9:
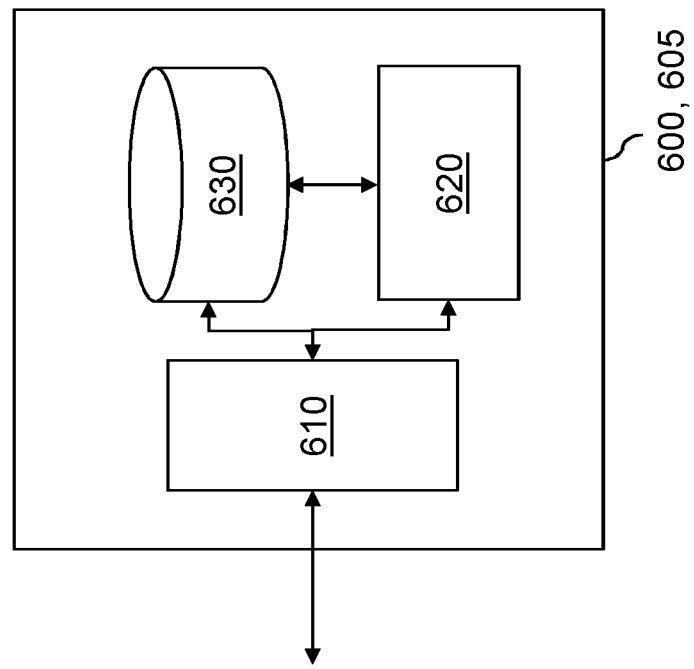
FIG. 9 shows a network node configured as an SFU.

FIG. 9 shows a more detailed view of the SFU 600, being in this example embodied by a single network node. It can be seen that the SFU 600 may comprise a network interface 610 for sending data such as stream updates and receiving data such as bitrate rate. The network interface 610 may also be used for the selective forwarding of data streams. The network interface 610 may take any suitable form, including but not limited to those described with reference to the network interface 510 of the SMGF 500 of FIG. 8.

The SFU 600 may further comprise a processor subsystem 620 which may be configured, e.g., by hardware design or software, to perform the operations described with reference to FIG. 3-7 and others in as far as pertaining to the SFU. For example, the processor subsystem 620 may be embodied by a single Central Processing Unit (CPU), but also by a system of such CPUs and/or other types of processing units. The SFU 600 may further comprise a storage, e.g., for use in caching. The storage may be of a same or similar type as the storage of the SMGF 500 as previously described with reference to FIG. 8.

In general, the SFU 600 may be embodied by a (single) device or apparatus. For example, the SFU 600 may be embodied by a single network node, e.g., a network server. The SFU 600 may also be embodied by a distributed system of such devices or apparatuses. An example of the latter may be the functionality of the SFU 600 being distributed over different network nodes of a network, for example using virtualization techniques.

Although described with reference to the SFU, FIG. 9 may also, in terms of architecture, represent a UE, and in particular a UE configured as a sender and/or receiver of a data stream which is selectively forwarded by the SFU. In such a case, reference numeral 600 may denote an end-user device such as smartphone, personal computer, laptop, tablet device, gaming console, set-top box, television, monitor, projector, smart watch, smart glasses, media player, media recorder, head mounted display device, etc. However, the sender and/or receiver UE may each also be embodied by a distributed system of devices or apparatuses.

In general, the SMGF 500 of FIG. 8 and the SFU 600 of FIG. 9 or the UE may each be embodied as, or in, a device or apparatus. The device or apparatus may comprise one or more (micro)processors which execute appropriate software. The processors of either system may be embodied by one or more of these (micro)processors. Software implementing the functionality of either system may have been downloaded and/or stored in a corresponding memory or memories, e.g., in volatile memory such as RAM or in non-volatile memory such as Flash. Alternatively, the processors of either system may be implemented in the device or apparatus in the form of programmable logic, e.g., as a Field-Programmable Gate Array (FPGA). Any input and/or output interfaces may be implemented by respective interfaces of the device or apparatus, such as a network interface. In general, each unit of either system may be implemented in the form of a circuit. It is noted that either system may also be implemented in a distributed manner, e.g., involving different devices, possibly using virtualization techniques.

Figure 10:
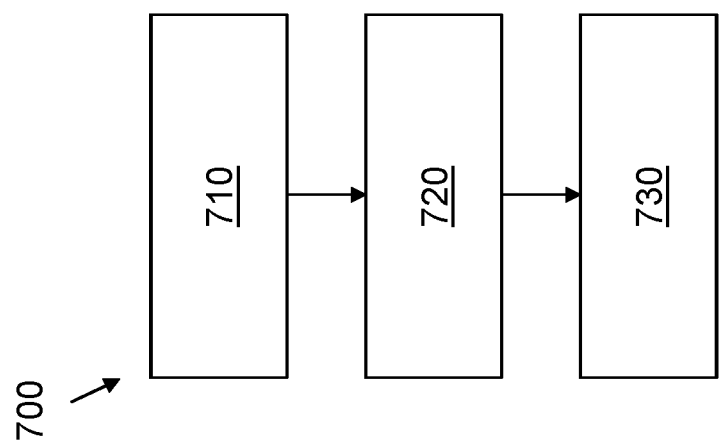
FIG. 10 shows a method for facilitating real-time transport of data streams.

FIG. 10 shows a computer-implemented method 700 for facilitating real-time transport of data streams in a communication network. The communication network may comprise one or more core network functions for establishing service guarantees for data flows in the communication network, and at least one selective forwarding unit which may be configured to, in real-time, receive a data stream from a sender via a first network link of the communication network and selectively forward the data stream to one or more receivers via respective second network links. The method 700 may comprise interfacing between the selective forwarding unit and the one or more core network functions by, in an operation titled "RECEIVING STREAM INFORMATION FROM SELECTIVE FORWARDING UNIT", receiving 710 stream information from the selective forwarding unit, the stream information being indicative of a first bandwidth associated with transport of the data stream via a select one or more network links, the select one or more network links being one or more of a group of: the first network link and the second network links, and in an operation titled "REQUESTING ESTABLISHMENT OF SERVICE GUARANTEE", based on the stream information, requesting 720 the one or more core network functions to establish a service guarantee for the transport of the data stream via the select one or more network links, and in an operation titled "PROVIDING TARGET BITRATE TO SELECTIVE FORWARDING UNIT", providing 730 bitrate information to the selective forwarding unit, the bitrate information being indicative of a target bitrate to be used for the transport of the data stream via the select one or more network links.

Figure 11:
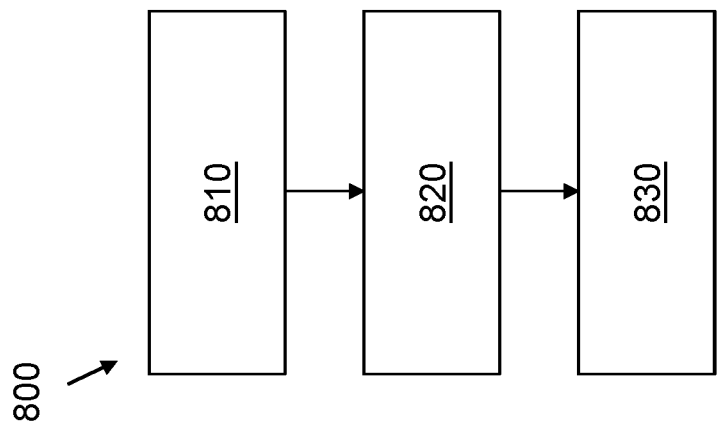
FIG. 11 shows a method for selectively forwarding data streams.

FIG. 11 shows a computer-implemented method 800 for, in real-time, receiving at least one data stream via a first network link of a communication network and selectively forwarding the at least one data stream to at least one receiver via a second network link. The method 800 may comprise, in an operation titled "PROVIDING PROVIDE STREAM INFORMATION TO ENTITY", providing 810 stream information to an entity providing an interface to one or more core network functions for establishing service guarantees for data flows in the communication network, the stream information being indicative of a first bandwidth associated with transport of the data stream via a select one or more network links, the select one or more network links being one or more of a group of: the first network link and the second network links. The method 800 may further comprise, in an operation titled "OBTAINING TARGET BITRATE FROM ENTITY", obtaining 820 bitrate information from the entity, the bitrate information being indicative of a target bitrate to be used for the transport of the data stream via the select one or more network links. The method 800 may further comprise, in an operation titled "PROVIDING TARGET BITRATE TO SENDER", providing 830 the bitrate information or another data representation of the target bitrate to the sender and/or one or more receivers.

It will be appreciated that, in general, the operations or steps of method 700 of FIG. 10 and/or method 800 of FIG. 11 may be performed in any suitable order, e.g., consecutively, simultaneously, or a combination thereof, subject to, where applicable, a particular order being necessitated, e.g., by input/output relations.

Figure 12:
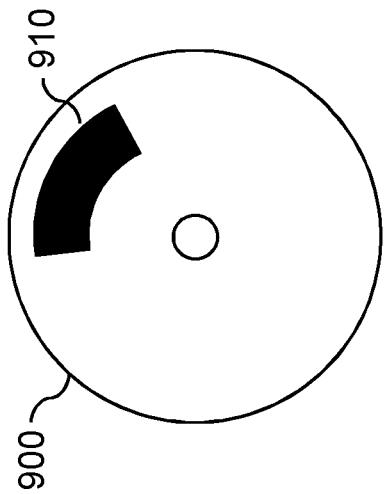
FIG. 12 shows a computer readable medium.

It is noted that any of the methods described in this specification, for example in any of the claims, may be implemented on a computer as a computer implemented method, as dedicated hardware, or as a combination of both. Instructions for the computer, e.g., executable code, may be stored on a computer readable medium 900 as for example shown in FIG. 12, e.g., in the form of a series 910 of machine-readable physical marks and/or as a series of elements having different electrical, e.g., magnetic, or optical properties or values. The executable code may be stored in a transitory or non-transitory manner. Examples of computer readable mediums include random access or read only memory devices, optical storage devices, integrated circuits, etc. FIG. 12 shows by way of example an optical storage device 900.

In an alternative embodiment of FIG. 12, the computer readable medium 900 may comprise transitory or non-transitory data 910 representing stream information or bitrate information, or any other data or data structure as described in this specification.

Figure 13:
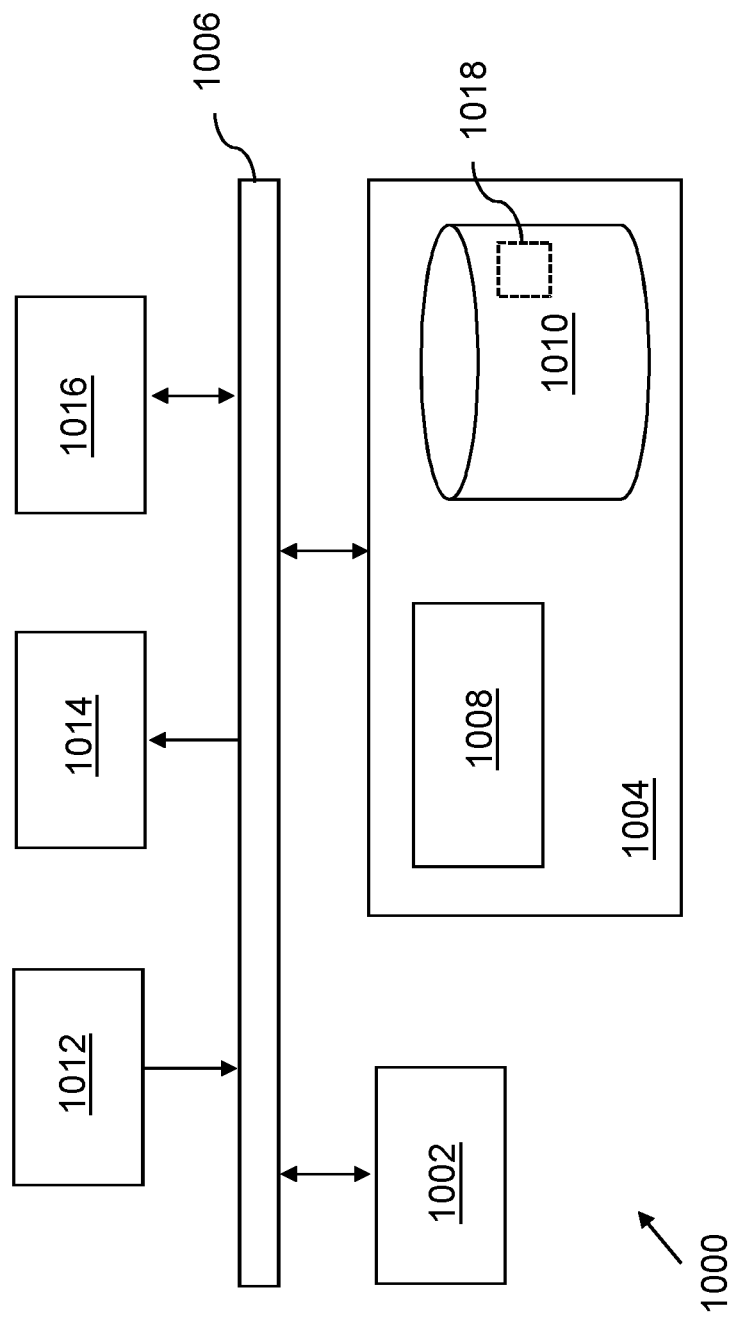
FIG. 13 shows an exemplary data processing system.

FIG. 13 is a block diagram illustrating an exemplary data processing system that may be used in the embodiments described in this specification. Such data processing systems include data processing entities described in this specification, including but not limited to the SMGF, the SFU or any of the UEs described in this specification.

The data processing system 1000 may include at least one processor 1002 coupled to memory elements 1004 through a system bus 1006. As such, the data processing system may store program code within memory elements 1004. Further, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

Memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The processing system 1000 may also include one or more cache memories (not shown) that provide temporary storage of at least some program code in order to reduce the number of times program code must be retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse, or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

Memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

In one aspect, for example, data processing system 1000 may represent the SMGF. In that case, application 1018 may represent an application that, when executed, configures data processing system 1000 to perform the functions described herein with reference to the SMGF. In another aspect, data processing system 1000 may represent the SFU. In that case, application 1018 may represent an application that, when executed, configures data processing system 1000 to perform the functions described herein with reference to the SFU. In another aspect, data processing system 1000 may represent a UE. In that case, application 1018 may represent an application that, when executed, configures data processing system 1000 to perform the functions described herein with reference to the UE.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A network node or a distributed system of network nodes for facilitating real-time transport of data streams in a communication network, wherein the communication network comprises:

one or more nodes each comprising a network interface and a processor subsystem implementing one or more core network functions for establishing service guarantees for data flows in the communication network, the one or more core network functions comprising at least one of a policy control function and a network management function;

at least one selective forwarding unit (SFU) configured to, in real-time, receive a data stream from a sender via a first network link of the communication network and selectively forward the data stream to one or more receivers via respective second network links;

wherein the network node or the distributed system comprises:

a network interface configured to interface with the communication network;

a processor subsystem configured to interface between the selective forwarding unit and the one or more core network functions by:

receiving stream information from the selective forwarding unit, the stream information being indicative of a first bandwidth associated with transport of the data stream via a select one or more network links, the select one or more network links being one or more of a group of: the first network link and the respective second network links;

based on the stream information, determining a second bandwidth based on the first bandwidth and requesting the one or more core network functions to establish a service guarantee for the transport of the data stream via the select one or more network links by requesting the second bandwidth to be allocated for the transport of the data stream via the select one or more network links; and based on the stream information, providing bitrate information to the selective forwarding unit, the bitrate information being indicative of a target bitrate to be used for the transport of the data stream via the select one or more network links.

2. The network node or the distributed system of network nodes according to claim 1, wherein the one or more core network functions comprise a policy control function, and wherein the processor subsystem is configured to request the policy control function to establish a quality-of-service (QoS)-based service guarantee for the transport of the data stream via the select one or more network links.

3. The network node or the distributed system of network nodes according to claim 1, wherein the one or more core network functions comprise a network management function, and wherein the processor subsystem is configured to request the network management function to establish the service guarantee via allocation or configuration of a network slice for the transport of the data stream.

4. The network node or the distributed system of network nodes according to claim 1, wherein the processor subsystem is configured to determine the second bandwidth as:
   the first bandwidth; or
   a function of the first bandwidth and resource information indicative of a bandwidth allocation and/or bandwidth capacity of the select one or more network links.

5. The network node or the distributed system of network nodes according to claim 1, wherein the processor subsystem is configured to determine the target bitrate based on at least one of:
   a response received from the one or more core network functions which is indicative of a guaranteed bandwidth; and
   a function of the first bandwidth and resource information indicative of a bandwidth allocation and/or bandwidth capacity of the select one or more network links.

6. A communication network comprising the network node or the distributed system of network nodes according to claim 1, wherein the network node or the distributed system is configured as a network function of the communication network for providing a network function-based interface between the selective forwarding unit and the one or more core network functions.

7. A computer-implemented method for facilitating real-time transport of data streams in a communication network, wherein the communication network comprises:
   one or more core network functions for establishing service guarantees for data flows in the communication network;
   at least one selective forwarding unit (SFU) configured to, in real-time, receive a data stream from a sender via a first network link of the communication network and selectively forward the data stream to one or more receivers via respective second network links;
   wherein the method comprises interfacing between the selective forwarding unit and the one or more core network functions by:
      receiving stream information from the selective forwarding unit, the stream information being indicative of a first bandwidth associated with transport of the data stream via a select one or more network links, the select one or more network links being one or more of a group of: the first network link and the second network links;
      based on the stream information, determining a second bandwidth based on the first bandwidth and requesting the one or more core network functions to establish a service guarantee for the transport of the data stream via the select one or more network links by requesting the second bandwidth to be allocated for the transport of the data stream via the select one or more network links; and
      based on the stream information, providing bitrate information to the selective forwarding unit, the bitrate information being indicative of a target bitrate to be used for the transport of the data stream via the select one or more network links.

8. A non-transitory computer-readable medium comprising a computer program, the computer program comprising instructions for causing a processor system to perform the method according to claim 7.

* * * * *